US011232299B2

(12) United States Patent
Semenov

(10) Patent No.: US 11,232,299 B2
(45) Date of Patent: Jan. 25, 2022

(54) IDENTIFICATION OF BLOCKS OF ASSOCIATED WORDS IN DOCUMENTS WITH COMPLEX STRUCTURES

(71) Applicant: ABBYY Production LLC, Moscow (RU)

(72) Inventor: Stanislav Semenov, Moscow (RU)

(73) Assignee: ABBYY Production LLC, Moscow (RU)

( * ) Notice: Subject to any disclaimer, the term of this patent is extended or adjusted under 35 U.S.C. 154(b) by 103 days.

(21) Appl. No.: 16/719,776

(22) Filed: Dec. 18, 2019

(65) Prior Publication Data

US 2021/0182550 A1 Jun. 17, 2021

(30) Foreign Application Priority Data

Dec. 17, 2019 (RU) .......................... RU2019141908

(51) Int. Cl.
*G06K 9/00* (2006.01)
*G06N 3/08* (2006.01)
*G06N 3/04* (2006.01)

(52) U.S. Cl.
CPC ..... *G06K 9/00463* (2013.01); *G06K 9/00456* (2013.01); *G06N 3/0454* (2013.01); *G06N 3/08* (2013.01); *G06K 2209/01* (2013.01)

(58) Field of Classification Search
CPC ........... G06K 9/00456; G06K 9/00463; G06K 2209/01; G06N 3/08; G06N 3/0454
USPC ....................................................... 382/158
See application file for complete search history.

(56) References Cited

U.S. PATENT DOCUMENTS

| | | | |
|---|---|---|---|
| 10,169,871 B2 | 1/2019 | Hibbard et al. | |
| 10,878,269 B2* | 12/2020 | Stark | G06N 3/0445 |
| 2007/0280536 A1 | 12/2007 | Zhang et al. | |
| 2018/0025248 A1 | 1/2018 | Shan et al. | |
| 2018/0137349 A1 | 5/2018 | Such et al. | |
| 2019/0258925 A1 | 8/2019 | Li et al. | |
| 2019/0294921 A1* | 9/2019 | Kalenkov | G06K 9/00201 |
| 2021/0012102 A1* | 1/2021 | Cristescu | G06F 16/56 |
| 2021/0125034 A1* | 4/2021 | Nguyen | G06N 3/08 |

OTHER PUBLICATIONS

Palm, Rasmus Berg, et al., "CloudScan—A Configuration-Free Invoice Analysis System Using Recurrent Neural Networks", arXiv:1708.07403v1 [cs.CL], Aug. 24, 2017, 8 pages.

(Continued)

*Primary Examiner* — Daniel G Mariam
(74) *Attorney, Agent, or Firm* — Lowenstein Sandler LLP

(57) ABSTRACT

Aspects of the disclosure provide for mechanisms for identification of blocks of associated words in documents using neural networks. A method of the disclosure includes obtaining a plurality of words of a document, the document having a first block of associated words, determining a plurality of vectors representative of the plurality of words, processing the plurality of vectors using a first neural network to obtain a plurality of recalculated vectors having values based on the plurality of vectors, determining a plurality of association values corresponding to a connections between at least two words of the document, and identifying, using the plurality of recalculated vectors and the plurality of association values, the first block of associated symbol sequences.

20 Claims, 13 Drawing Sheets

(56) References Cited

OTHER PUBLICATIONS

Katti, Annop R., et al., "Applying Sequence-to-Mask Models for Information Extraction from Invoices", Short Papers Booklet DAS 2018, 13 IAPR International Workshop on Document Analysis Systems, Vienna, Austria, April 24-27, pp. 9-10.
Raoui-Outach, Rizlene, et al., "Deep Learning for Automatic Sale Receipt Understanding", 2017 IEEE, arXiv:1712 01606v1 [cs.CV] Dec. 5, 2017, 8 pages.

* cited by examiner

Purchasing Order

- Seller's Logo 151
- Seller's Name 150
- Seller's Street 152
- City 154
- Zip 156
- Country 158
- Buyer's Name 160
- Goods A 190
- Goods B 191
- Goods C 192
- Quantity A 193
- Quantity B 194
- Quantity C 195
- SubTotal A 196
- SubTotal B 197
- SubTotal C 198
- Total 199
- Buyer's Street 162
- City 164
- Zip 166
- Country 168
- Buyer's IBAN 180
- Buyer's BIC/SWIFT 182
- Seller's IBAN 170
- Seller's BIC/SWIFT 172

FIG. 1B

IDENTIFICATION OF BLOCKS OF ASSOCIATED WORDS IN DOCUMENTS WITH COMPLEX STRUCTURES

RELATED APPLICATIONS

This application claims the benefit of priority under 35 USC 119 to Russian patent application No. RU2019141908, filed Dec. 17, 2019.

TECHNICAL FIELD

The implementations of the disclosure relate generally to computer systems and, more specifically, to systems and methods for detecting blocks of associated words or other symbol sequences in electronic documents with complex structures, using neural networks.

BACKGROUND

Detecting text fields in an image of a document is a foundational task in processing, storing, and referencing documents. Conventional approaches for field detection may involve the use of a large number of manually configurable heuristics and may thus require many human operations.

SUMMARY OF THE DISCLOSURE

Implementations of the present disclosure describe mechanisms for detecting blocks of associated words and other symbol sequences in images of documents using neural networks. A method of the disclosure includes: obtaining a plurality of symbol sequences of a document, the document having a first block of associated symbol sequences, the first block comprising two or more symbol sequences of the plurality of symbol sequences, determining a plurality of vectors, wherein a vector of the plurality of vectors is representative of one of the plurality of symbol sequences, processing, by a processing device, the plurality of vectors using a first neural network to: obtain a plurality of recalculated vectors, wherein each of the plurality of recalculated vectors is recalculated based on values of the plurality of vectors, and determine a plurality of association values, wherein each of the plurality of association values corresponds to one of a plurality of connections between at least two symbol sequences of the plurality of symbol sequences, and identifying, by the processing device, using the plurality of recalculated vectors and the plurality of association values, the first block of associated symbol sequences.

A non-transitory machine-readable storage medium of the disclosure includes instructions that, when accessed by a processing device, cause the processing device to: obtain a plurality of symbol sequences of a document, the document having a first block of associated symbol sequences, the first block comprising two or more symbol sequences of the plurality of symbol sequences, determine a plurality of vectors, wherein a vector of the plurality of vectors is representative of one of the plurality of symbol sequences, process the plurality of vectors using a first neural network to: obtain a plurality of recalculated vectors, wherein each of the plurality of recalculated vectors is recalculated based on values of the plurality of vectors, and determine a plurality of association values, wherein each of the plurality of association values corresponds to one of a plurality of connections between at least two symbol sequences of the plurality of symbol sequences, and identify, using the plurality of recalculated vectors and the plurality of association values, the first block of associated symbol sequences.

A system of the disclosure includes a memory, and a processing device operatively coupled to the memory, the processing device to: obtain a plurality of symbol sequences of a document, the document having a first block of associated symbol sequences, the first block comprising two or more symbol sequences of the plurality of symbol sequences, determine a plurality of vectors, wherein a vector of the plurality of vectors is representative of one of the plurality of symbol sequences, process the plurality of vectors using a first neural network to: obtain a plurality of recalculated vectors, wherein each of the plurality of recalculated vectors is recalculated based on values of the plurality of vectors, and determine a plurality of association values, wherein each of the plurality of association values corresponds to one of a plurality of connections between at least two symbol sequences of the plurality of symbol sequences, and identify, using the plurality of recalculated vectors and the plurality of association values, the first block of associated symbol sequences.

BRIEF DESCRIPTION OF THE DRAWINGS

The disclosure will be understood more fully from the detailed description given below and from the accompanying drawings of various implementations of the disclosure. The drawings, however, should not be taken to limit the disclosure to the specific implementations, but are for explanation and understanding only.

FIG. 1B is an exemplary illustration of a document that may be used to train one or more of the neural networks that may operate in accordance with some implementations of the present disclosure.

DETAILED DESCRIPTION

Figure 1A:
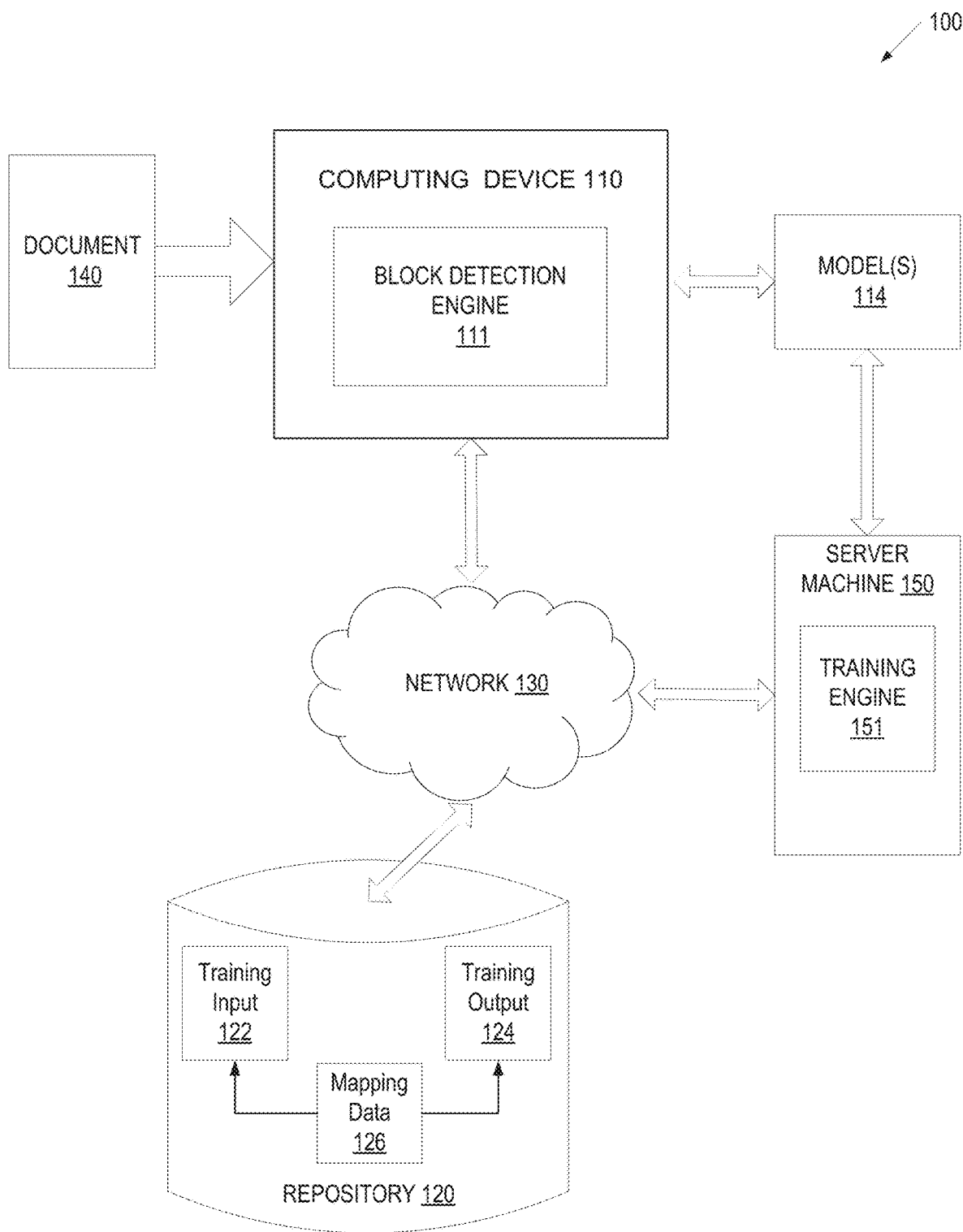
FIG. 1A is a block diagram of an example computer system in which implementations of the disclosure may operate.

Implementations for detecting blocks of associated words and other symbol sequences (e.g., numbers, graphic elements) in electronic documents having a complex structure using neural networks are described. A typical document may include a variety of fields (such as a field "account number" or "borrower") filled with symbol sequences (such as, 1003572, and "John Smith," for the values of the corresponding fields). One conventional approach for identifying fields and their values in such documents is based on heuristics. In the heuristic approach, a large number (e.g., hundreds) of documents, such as restaurant checks or receipts, for example, are taken and statistics are accumulated regarding what text (e.g., keywords) can be used next to a particular field and where this text can be placed relative to the field (e.g., within the field, to the right, left, above, below it). For example, the heuristic approach can track what word or words are frequently located within or next to the field indicating the total purchase amount, what word or words are within or next to the field indicating applicable taxes, what word or words are within or next to the field indicating the total payment on a credit card, etc. Based on these statistics, when processing a new check, it can be determined which data detected on the document corresponds to a particular field. The heuristic approach does not always work precisely, however, because if for some reason a check has been recognized with errors, namely in the word combinations "Total Tax" and "Total Paid" the words "tax" and "paid" were poorly recognized, the corresponding values might be miscategorized.

Additional difficulties in recognition of fields in electronic documents arise in documents having complex structures. In addition to fields that may be populated with one or more words, a document may have blocks of words that are logically associated with each other. A block may include words at multiple locations within the document, which may not be located close to each other. For example, the document may have various parts of a sender's address, which may include "country," "city," "street," "building number," "zip code," and so on. Some of these logically associated parts may be located within different lines of the document. In some implementations, blocks of associated words (or other symbol sequences) may be located at opposite ends of the document. For example, a seller's account number may be located at the bottom of a page and may be logically associated with the seller's name that is typed at the top of the page. In some instances, a document may have multiple pages and blocks may include associated symbol sequences located on multiple (two or more) pages. Heuristics methods are particularly ineffective in block recognition within documents with such complex structures.

Aspects of the present disclosure address the above noted and other deficiencies by providing mechanisms for identification of blocks of associated symbol sequences in documents using neural networks. The mechanisms described can automatically detect blocks contained in a document and identify associated symbol sequences in such blocks. As used herein, "electronic document" (also referred to simply as "document" herein) may refer to any document whose image may be accessible to a computing system that performs identification of blocks of associated symbol sequences. The image may be a scanned image, a photographed image, or any other representation of a document that is being capable of being converted into a data form accessible to a computer. For example, "electronic document" may refer to a file comprising one or more digital content items that may be visually rendered to provide a visual representation of the electronic document (e.g., on a display or a printed material). In accordance with various implementations of the present disclosure, a document may conform to any suitable electronic file format, such as PDF, DOC, ODT, JPEG, etc. Although the document may be represented in an electronic (e.g., digital) file format, it is presumed that the document is not electronically partitioned and that the document layout—locations of various text fields, tables, paragraphs, etc. —is not specified in the electronic file. (As, for example, would be the case if the document were originally issued in an electronic format—an e-invoice or other similar electronic documents—with the locations of the fields and blocks already specified.)

"Document" may represent a financial document, a legal document, or any other document, e.g., a document that is produced by populating fields with alphanumeric symbols (e.g., letters, words, numerals) or images. "Document" may represent a document that is printed, typed, or handwritten (for example, by filling out a standard form). "Document" may represent a form document that has a variety of fields, such as text fields (containing numerals, numbers, letters, words, sentences), graphics fields (containing a logo or any other image), tables (having rows, columns, cells), and so on. Some of the fields may be associated into logical blocks. As used herein, "field" may refer to any data field in document that contains alphanumeric characters and a "block" may refer to logical association of multiple fields even though the corresponding fields may be located at different parts of the document.

Some non-limiting examples of documents for block identification may include documents that have a standard content (which may be mandated by official regulations or established business practices) but flexible distribution of this content within the document—mortgage/credit applications, real-estate purchase contracts, loan estimates, insurance contracts, police reports, purchasing orders, invoices, and so on. Documents may have blocks that are encountered once or repeated multiple times within the same form (such as addresses of multiple buyers) or blocks that may have multiple values (such as multiple account numbers of the seller).

As used herein, "symbol sequence" may mean any sequence of characters, numbers, glyphs, graphical elements, punctuation marks, and the like. A symbol sequence may be typed, impressed, printed, painted on, or handwritten using any font, typeset, picture, impression, cursive writing, and the like. Symbols in a symbol sequence may be separated by spaces. A symbol sequence may include a company logo, a signature, an image of a merchandize used in place of (or in addition to) a description of the merchandize, or any other image that may be included in a document. As may be sometimes used in this disclosure, for brevity and conciseness, "word" may indicate any symbol sequence.

The techniques described herein allow for automatic detection of blocks of associated symbol sequences in documents using artificial intelligence. The techniques may involve training an artificial neural network to detect symbol sequences in documents. In some implementations, after representations of symbol sequences are processed by the neural network(s), symbol sequences may be identified as belonging to a particular "class," which may refer to a type of content expressed in the symbol sequence. For example, a symbol sequence may be classified as "name," "company name," "telephone," "fax," "street," "vendor name," "type of payment," "method of payment," "type of merchandize," "quantity of merchandize," or any other entry that may be present in a document. The neural network(s) may include multiple neurons that are associated with learnable weights and biases. The neurons may be arranged in layers. The neural network may be trained on a training dataset of documents that contain known blocks of logically associated words. For example, the training data set may include examples of documents containing one or more blocks of associated words as training inputs and word identifiers (classes or types) that correctly identify (e.g., classify) words in the blocks of associated words, as training outputs. For example, a logical block "address" may include words that are identified as "street," "city," "country," and so on. A logical block "purchaser's info" may include words that are identified as "purchaser's business name," "place of incorporation," "bank account number," and the like.

The neural network may generate an observed output for each training input. The observed output of the neural network may be compared with a training output corresponding to the desired output as specified by the training data set, and the error may be propagated back to the previous layers of the neural network, whose parameters (e.g., the weights and biases of the neurons) may be adjusted accordingly. During training of the neural network, the parameters of the neural network may be adjusted to optimize prediction accuracy.

Once trained, the neural network may be used for automatic detection of blocks of associated words and selection of the most probable class of each of the detected words. The use of neural networks may prevent the need for manual markup of words in documents during the identification phase. The mechanisms described herein to detect blocks of associated words in a document may improve the quality of detection results by performing block detection using a trained neural network in a way that takes into account a context of the entire document. For example, neural networks set and trained in accordance with implementations of this disclosure may be capable of detecting blocks of words and classification of words belonging to the detected blocks based on other words that are present in the entire document. For example, a neural network may identify a numerical sequence in the bottom-left corner of a document enclosed by characteristic boldfaced bar-colon punctuation mark as a bank routing number. Consequently, a neural network trained to take into account a context of the whole document may be capable of looking for other words that may belong to the same block (as the bank routing number does). Furthermore, based on the context of the whole document, the neural network may be capable to identify other logical blocks that may be present in the same document. As an outcome of the detection process, the document may be partitioned into blocks of associated words. Within each identified block, information carried by various words may be determined and stored. Additionally, there may be words that are not associated into blocks; such words may be recognized as values input into unassociated fields.

A neural network trained in accordance with implementations of this disclosure may be applied to identification of any type of documents and may enable efficient block detection, thus improving both the accuracy of identification as well as the processing speed of a computing device implementing such identification.

FIG. 1A is a block diagram of an example computer system 100 in which implementations of the disclosure may operate. As illustrated, system 100 can include a computing device 110, a repository 120, and a server machine 150 connected to a network 130. Network 130 may be a public network (e.g., the Internet), a private network (e.g., a local area network (LAN) or wide area network (WAN)), or a combination thereof.

The computing device 110 may be a desktop computer, a laptop computer, a smartphone, a tablet computer, a server, a scanner, or any suitable computing device capable of performing the techniques described herein. In some implementations, the computing device 110 can be (and/or include) one or more computing devices 900 of FIG. 9.

A document 140 may be received by the computing device 110. The document 140 may include any text(s), image(s), or table(s), including one or more characters (e.g., letters and/or numbers), words, sentences, etc. The document 140 may be of any predefined type, such as "business card," "invoice," "passport," "medical policy," "questionnaire," etc. The type of the document 140 may be specified by a user and communicated to the computing device 110 together with the document 140, in some implementations.

The document 140 may be received in any suitable manner. For example, the computing device 110 may receive a digital copy of the document 140 by scanning a document or photographing the document. Additionally, in instances where the computing device 110 is a server, a client device connected to the server via the network 130 may upload a digital copy of the document 140 to the server. In instances where the computing device 110 is a client device connected to a server via the network 130, the client device may download the document 140 from the server or from the repository 120.

The document 140 may be used to train a set of machine learning models or may be a new electronic document for which block detection and/or classification is desired. In some implementations, if used for training one or more machine learning models (neural networks) 114 for subsequent recognition, the document 140 may be appropriately prepared to facilitate training. For instance, in the document 140, text sequences and/or table elements may be manually or automatically selected, characters may be marked, text sequences/graphics/table elements may be normalized, scaled and/or binarized. In some implementations, text in the document 140 may be recognized using any suitable optical character recognition (OCR) technique.

In one implementation, computing device 110 may include a block detection engine 111 to detect blocks of associated symbol sequences. The block detection engine 111 may include instructions stored on one or more tangible, machine-readable storage media of the computing device 110 and executable by one or more processing devices of the computing device 110. In one implementation, the block detection engine 111 may use a set of trained machine learning models 114. The machine learning models 114 are trained and used to detect and/or classify blocks of associated symbol sequences in an input document.

The block detection engine 111 may preprocess any documents prior to using the documents for training of the machine learning models 114 and/or applying the trained machine learning models 114 to the documents. In some instances, the trained machine learning models 114 may be part of the block detection engine 111 or may be accessed on another machine (e.g., server machine 150) by the block detection engine 111. Based on the output of the trained machine learning models 114, the block detection engine 111 may detect one or more blocks of associated words and one or more unassociated fields. The block detection engine 111 may identify various words of the document as belonging to the identified blocks and/or unassociated fields.

The block detection engine 111 may be a client-based application or may be a combination of a client component and a server component. In some implementations, the block detection engine 111 may execute entirely on the client computing device such as a server computer, a desktop computer, a tablet computer, a smart phone, a notebook computer, a camera, a video camera, or the like. Alternatively, a client component of block detection engine 111 executing on a client computing device may receive a document and transmit it to a server component of the block detection engine 111 executing on a server device that performs the block detection. The server component of the block detection engine 111 may then return a recognition result (e.g., a plurality of detected blocks and a plurality of words that belong to the detected blocks) to the client component of the block detection engine 111 executing on the client computing device for storage. Alternatively, the server component of the block detection engine 111 may provide a recognition result to another application. In other implementations, block detection engine 111 may execute on a server device as an Internet-enabled application accessible via a browser interface. The server device may be represented by one or more computer systems such as one or more server machines, workstations, mainframe machines, personal computers (PCs), etc.

Server machine 150 may be and/or include a rackmount server, a router computer, a personal computer, a portable digital assistant, a mobile phone, a laptop computer, a tablet computer, a camera, a video camera, a netbook, a desktop computer, a media center, or any combination of the above. The server machine 150 may include a training engine 151. The training engine 151 can construct the machine learning model(s) 114 for block detection. The machine learning model(s) 114, as illustrated in FIG. 1A, may be trained by the training engine 151 using training data that includes training inputs and corresponding training outputs (correct answers for respective training inputs). The training engine 151 may find patterns in the training data that map the training input to the training output (the result to be predicted), and provide the machine learning models 114 that capture these patterns. As described in more detail below, the set of machine learning models 114 may be composed of, e.g., a single level of linear or non-linear operations (e.g., a support vector machine (SVM)) or may be a deep neural network, e.g., a machine learning model that is composed of multiple levels of non-linear operations. Examples of deep neural networks are neural networks including convolutional neural networks, recurrent neural networks (RNN) with one or more hidden layers, and fully connected neural networks. In some implementations, the machine learning models 114 may include one or more neural networks as described in connection with FIGS. 2, 3, and 4A.

The machine learning models 114 may be trained to detect blocks of associated words and unassociated fields in the document 140 and to determine the most probable classes for various words in the document 140. The training engine 151 may generate training data to train the machine learning models 114. The training data may be stored in the repository 120 and may include one or more training inputs 122 and one or more training outputs 124. The training data may also include mapping data 126 that maps the training inputs 122 to the training outputs 124. In some implementations, the mapping data 126 may include the listing of at least some of the blocks in the training inputs 122 and the listing of corresponding to the blocks values of the associated symbol sequences. For example, the mapping data may include the block "seller's address" and a listing of some (or all) associated (with this block) symbol sequences" within a specific training input document. The training inputs 122 may include a training set of documents including text, images, or tables (also referred to as the "training documents"). Each of the training documents may be a document having one or more known blocks of associated words. The training outputs 124 may be classes of words populating the known blocks (and unassociated fields). For example, a first training document in the first training set may include a first known block (e.g., financial information of the buyer). The first training document may be a first training input 122 that may be used to train the machine learning model(s) 114. The training output 124 corresponding to the first training input 122 may include a class representing each word (in the first training input 122) that belongs to the first known block of words (e.g., "account number," "routing number," "bank," etc.). During the training, the training engine 151 can find patterns in the training data 126 that can be used to map the training inputs to the training outputs. The patterns can be subsequently used by the machine learning model(s) 114 for future predictions. For example, upon receiving an input of a document that contains blocks (and unassociated fields) of words to be identified, the trained machine learning model(s) 114 may identify one or more blocks of associated words, predict a class to which various words of the block belong and output (store) the predicted associations of words and their classes. As another example, the trained machine learning model(s) may look for specific blocks that are of interest to the client (e.g., those blocks that have been designated by the client to be of importance) and determine all words in the document that belong to such blocks. For example, a client may be interest only in blocks that contain financial information, but not in listings of merchandize.

The repository 120 may be a persistent storage capable of storing documents as well as data structures to perform character recognition in accordance with implementations of the present disclosure. The repository 120 may be hosted by one or more storage devices, such as main memory, magnetic or optical storage based disks, tapes or hard drives, NAS, SAN, and so forth. Although depicted as separate from the computing device 110, in an implementation, the repository 120 may be part of the computing device 110. In some implementations, repository 120 may be a network-attached file server, while in other implementations content repository 120 may be some other type of persistent storage such as an object-oriented database, a relational database, and so forth, that may be hosted by a server machine or one or more different machines coupled to the via the network 130.

In some implementations, the training engine 151 may train one or more artificial neural networks (models 114) that each comprise multiple neurons to perform block detection in accordance with some implementations of the present disclosure. Each neuron may receive its input from other neurons or from an external source and may produce an output by applying an activation function to the sum of weighted inputs and a trainable bias value. A neural network may include multiple neurons arranged in layers, including an input layer, one or more hidden layers, and an output layer. Neurons from adjacent layers are connected by weighted edges. The edge weights are defined at the network training stage based on a training dataset that includes a plurality of documents with known blocks and classes of words. In an illustrative example, all the edge weights may be initially assigned some random values. For every input 122 in the training dataset, the training engine 151 may activate the appropriate neural network (selection of the appropriate neural network may be performed by the clustering engine 112. The observed output of the neural network $OUTPUT_{NN}$ (TRAINING INPUT) is compared with the desired training output 124 specified by the training data set:

Compare: $OUTPUT_{NN}$(TRAINING INPUT) vs. TRAINING OUTPUT.

The resulting error—the difference between the output of the neural network $OUTPUT_{NN}$ and the desired TRAINING OUTPUT is propagated back to the previous layers of the neural network, in which the weights are adjusted so as to modify the $OUTPUT_{NN}$ and make it closer to the TRAINING OUTPUT. This adjustment may be repeated until the output error for a particular training input 122 satisfies a predetermined condition (e.g., falls below a predetermined threshold). Subsequently, a different training input 122 may be selected, a new $OUTPUT_{NN}$ may be generated, a new series of adjustments may be implemented, and so on, until the neural network is trained to a sufficient degree of accuracy. In some implementations, this training method may be applied to training one or more artificial neural networks illustrated in FIGS. 2, 3, and 4A.

Once the machine learning models 114 are trained, the set of machine learning models 114 can be provided to the block detection engine 111 for analysis of target documents. For example, the block detection engine 111 may input a target document into the set of machine learning models 114. The block detection engine 111 may obtain one or more identification outputs from the set of trained machine learning models and may extract, from the identification outputs, a set of predicted blocks of associated words and the classes of these words. The predicted class of a word may characterize a likely (e.g., most probable) type represented by the word (e.g., "name," "address," "company name," "logo," "email," etc.).

FIG. 1B is an exemplary illustration of a document 140 that may be used to train one or more of the neural networks that may operate in accordance with some implementations of the present disclosure. As shown, the document 140 (e.g., a purchasing order filled out by a seller) may include a variety of symbol sequences, such as seller's name 150, seller's logo 151, seller's address including street 152, city 154, zip 156, country 158, and the like. The document may also include buyer's name 160 and buyer's address, which may include street 162, city 164, zip 166, country 168, etc. The document 140 may have listing of goods 190-192 that are being purchased, their respective quantities 191-193, subtotals 196-198, as well as the total amount 199 to be tendered. The document 140 may include seller's and buyer's financial information, such as the seller's MAN 170, seller's BIC/SWIFT 172, buyer's MAN 180, and seller's BIC/SWIFT 182. The training document 140 may have additional information that is not shown in FIG. 1B. The training document 140 may be a multi-page document, in some implementations.

As illustrated in FIG. 1B, some of the words that may be logically associated in blocks may be placed at different locations within the document 140. For example, a first logical block (indicated by dashed boxes and connectors) may include seller's name 150, address 152-158, and seller's financial information 170-172. A second logical block (indicated by dotted boxes and connectors) may include buyer's name 160, address 162-168, and buyer's financial information 180-182. Goods A 190, quantity of goods A 193, and subtotal for goods A 196 may represent a third logical block (not shown), and so on. Some words may belong to unassociated fields, such as the total 199. The block associations in the training document 140 may be identified and used in training of the machine learning models 114. The block associations may depend on the task being supported and client's objectives. For example, depending on the task, some of the blocks in document 140 may have fewer or more associations. For example, the seller's block (dashed box) may only include the seller's name 150 and financial information 170-172, but not include the address 152-158, in some implementations. Accordingly, block detection may be tailored to the needs of a particular client. Training documents 140 may, therefore, be selected from actual documents used by that client. A different client, who may be interested in a different information, may use the machine learning models 114 that are trained to detect a different set of block associations. If clients' needs change with time, the machine learning models 114 may be re-trained using a new set of training document. To meet varying needs of different clients, the training (or re-training) may be performed on the client side.

The document 140 prepared as a training input 122 may have a mapping data 126 associated with the document 140. The mapping data 126 may identify various blocks of associated words and may further identify words of these blocks as belonging to specific classes of words. For example, the mapping data may index word by their coordinates (e.g. coordinates of a bounded box containing the word) and indicate the class of the word and to which block of associated words (if any) the indexed word belongs.

After the model 114 is trained based on the training document 140, the model(s) 114 may be capable of finding and identifying blocks of associated words in the training document 140 as well as in target documents that have not been used in training.

Figure 1C:
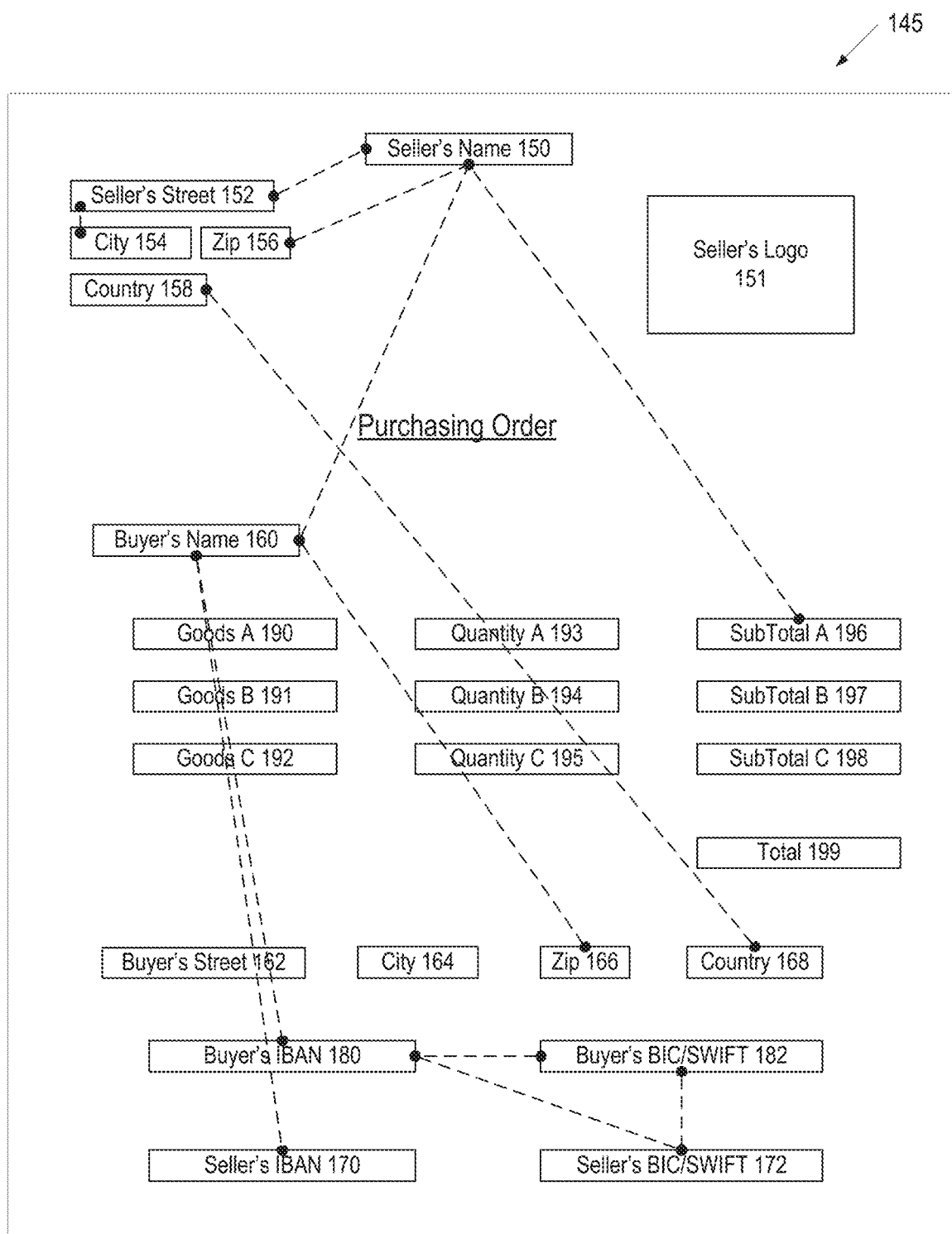
FIG. 1C is an exemplary illustration of pre-processing of a target document that may be input into one or more of the neural networks trained to detect blocks of associated symbol sequences, in accordance with some implementations of the present disclosure.

FIG. 1C is an exemplary illustration of pre-processing of a target document 145 that may be input into one or more of the neural networks trained to detect blocks of associated symbol sequences, in accordance with some implementations of the present disclosure. The document 145 may have a layout that is different from the layout of the training documents (such as document 140). Although the same blocks are shown in the document 145 as in the training document 140, additional blocks may be present in the document 145 that are absent in the training documents 140. Conversely, some of the blocks of the training document 140 may not be present in the document 145. In some implementations, prior to inputting the document 145 into the trained neural network(s), the block detection engine 111 may construct a plurality of connections (indicated by dashed lines) between various words of the document 145. Such connections may serve as possible—although not necessarily probable, at this stage in the detection process— associations between words. In some implementations, the connections may be between all words and all other words of the document 145. For example, if the document has N words, the number of pairwise connections between words may be as high as N!. In documents with a large number of words, tracking all such connection and estimating likelihoods that these connections indicate a probable association between respective words may be a prohibitively computation-heavy task. The block detection engine 111, may therefore reduce the number of connections by using an algorithm that discards connections representing unlikely associations. In some implementations, such algorithm may itself be based on a neural network model, which may be trained to keep only connections that have the likelihood of at least 10%, 20%, or any other pre-determined probability of representing an actual association. The corresponding neural network model may be trained using a number of training documents with actual associations being marked-up. The neural network model may be trained until it consistently discards no more than a certain first threshold (e.g., no more than 10%) of the actual associations and/or no less that a certain second threshold (e.g., no less than 60%) of connections between words that are not associated with each other. For example, the model may be trained to discard connections between seller's logo 151 and the total amount 199.

The connections may be horizontal (as between seller's MAN 170 and seller's BIC/SWIFT 172), vertical (as between seller's street 152 and seller's city 154), or arbitrary (as, between seller's name 150 and buyer's name 160). In some implementations, the connections may be three-way (or four-way, etc.) cluster connection (such as a cluster connection linking buyer's IBAN 180, buyer's BIC/SWIFT 182, and seller's BIC/SWIFT 172. Apart from discarding connections representing unlikely associations, at this stage in the process, a computing system performing the block detection may be agnostic regarding how likely the constructed connections may represent actual block associations to be determined as described below. In some implementations, only a small number of all identified connections will eventually be determined to represent actual block associations.

Figure 2:
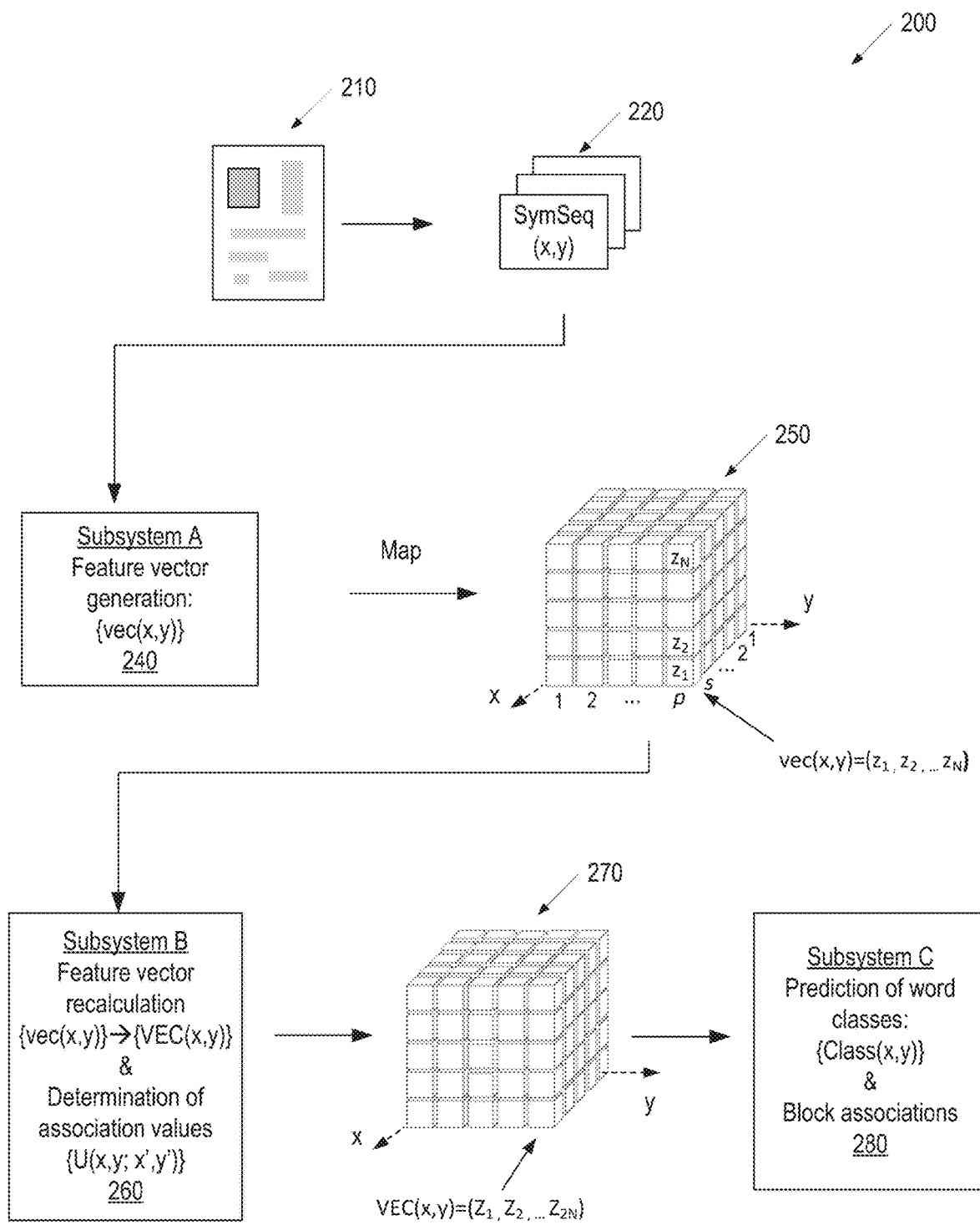
FIG. 2 is a schematic diagram illustrating an example of a neural network system that uses global document context for detecting blocks of associated symbol sequences in electronic documents having a complex structure, in accordance with some implementations of the present disclosure.

FIG. 2 is a schematic diagram illustrating an example 200 of a neural network system that uses global document context for detecting blocks of associated symbol sequences in electronic documents having a complex structure, in accordance with some implementations of the present disclosure. The neural network system 200 may include multiple neurons that are associated with learnable weights and biases. The neurons may be arranged in layers. Some of the layers may be hidden layers. As illustrated, the neural network system 200 may include a subsystem A 240, a subsystem B 260, and a subsystem C 280. Each of the subsystems 240, 260, and 280 may include multiple neuron layers and may be configured to perform one or more functions for detection of blocks associated symbol sequences, in accordance with the present disclosure.

The input into the block detection engine 111 may be one or more documents 210. If documents 210 are in a physical format (e.g., paper, film, etc.), the block detection engine 111 or the computing device 110 (or the server machine 150) may obtain images of such physical documents and convert the images into digital images (e.g., by scanning) belonging to some digital format (JPEG, TIFF, GIG, BMP, CGM, SVG, and so on). The block detection engine 111 may also perform an OCR of the digital images.

The imaging may occur immediately before the document image 210 is processed by the neural network system 200, in some implementations. In some implementations, the imaging may occur at some point in the past, and the document image 210 may be obtained from a local or network (e.g., cloud) storage. The document image 210 may undergo OCR to obtain an OCR text of the document and, in some implementations, to partition the OCR text into a plurality of symbol sequences representing various words, numbers, sentences, pictures, etc., of the document. Similarly, the OCR may be performed immediately before further processing by the neural network system 200 or at some point in the past. The OCR may be further accompanied with pre-processing of the document image 210 to improve its quality, e.g., scaling, changing the aspect ratio, gray-scaling, normalization, data augmentation, amplification, binarization, and so on.

The outcome of the OCR of the document image 210 may be a set of recognized sequences of symbols SymSeq(x,y) associated with the coordinates (x,y) of the document image 210. The symbol sequences SymSeq may be include one or more alphanumeric characters that may be combined into syllables, words, and/or sentences. The symbol sequences SymSeq may include one or more punctuation marks, such as a comma, period, ellipses, or any other marks. The sequences SymSeq may be horizontal, vertical, or oblique lines of tables, or three-way or four-way intersections of the lines. The lines may be single, double, etc. The symbol sequences SymSeq may be any combinations of characters, punctuation marks, and/or lines. In some implementations, to generate the symbol sequences SymSeq contained in the document image 210, the block detection engine 111 (or any other component that performs or has performed OCR on the document image 210) may use suitable character recognition methods, divide the text of the document into multiple words, and extract multiple character sequences from the words.

The identified symbol sequences SymSeq may be mapped to the corresponding regions of the document image 210 where these sequences are located. For example, each SymSeq may be associated with one or more sets of coordinates (x,y) that identify locations of the sequences. The coordinates may be Cartesian coordinates or any other (e.g., polar) coordinates that may be convenient in identifying locations of the symbol sequences. A single character, punctuation mark, or a short line may be identified by a single set of coordinates (x,y) whereas longer sequences (words, sentences, long lines) may be identified by multiple sets (x,y), such as the coordinates of the four corners of a box enclosing the sequence, in one implementation. A lines may be identified by the coordinates of the two ends of the line. An intersection of two lines (e.g., a three-way or a four-way intersection) may be identified by the coordinates of the ends of all lines as well as the coordinates of the intersection. In this disclosure, (x,y) shall denote any identification of symbol sequences with one or more set of coordinates, as may be needed for a specific SymSeq.

The block detection engine 111 may input the symbol sequences SymSeq(x,y) into the subsystem A 240 to generate feature vector representations for each of the symbol sequences: SymSeq(x,y)→vec(x,y). Each of the feature vectors vec(x,y) may be a symbolic vector embedding of one of the symbol sequences (e.g., words/sentences, punctuation marks and/or lines), which is also referred to as a word embedding. In some implementations, each of the symbolic vector embeddings may have a certain length (e.g., a predetermined length). When the length of a character sequence is shorter than the certain length, predetermined values may be added to generate a symbolic vector embedding of the predetermine length (e.g., zeros may be added to the vectors). "Symbolic vector embedding" or "vector embedding" as used herein may refer to a vector of real numbers or any other numeric representation of a symbol sequence. A vector embedding may be produced, for example, by a neural network implementing a mathematical transformation on symbols (words/punctuation marks/lines of tables) using embedding functions to map such symbols into their numeric representations.

The vector embeddings vec(x,y)—also referred herein as vector representations of symbol sequences SymSec(x,y) or simply as "vectors"—may be generated using any suitable model or combination of models, such as Word2Vec, GloVe, FastText, etc. The subsystem A 240 may use a plurality of neuron layers, such as an input layer, an output layer, and one or more hidden layers. The subsystem A 240 may be a recurrent neural network (RNN), a character-level RNN, a long short-term memory (LSTM) network, or any other similar network, including any combination of such networks. The subsystem A 240 may operate on an embeddings dictionary that may include vector representations of typical words found in the documents of the pertinent types. The subsystem A 240 may be trained to generate such vector representations of symbol sequences SymSeq(x,y) that have close numerical values vec(x,y) for the words that have close semantic meanings (e.g., "number" and "quantity") or that may be found in close proximity to each other (e.g. "amount" and "tendered"). The subsystem A 240 may be previously trained using training inputs 122 and training outputs 124, as described above. The documents used in training phase—the training inputs 122 and training outputs 124—may be the documents of the same type as the target documents (e.g., invoices, checks, purchasing orders, and so on) that are to be used during the prediction phase. Accordingly, while the dictionary for the vector embeddings SymSec(x,y) may be developed during the training phase for the specific class of target documents, the vector embeddings SymSec(x,y) need not belong to an embeddings dictionary pre-trained on some wider class of documents (e.g., books, newspapers, magazines) that are unrelated to the specific class of target documents. The trained first subsystem 240 may be capable of predicting what symbol sequence SymSeq follows (or precedes, or is adjacent along a vertical or horizontal direction) a particular SymSeq. The predictions of the first subsystem 240 may come in the form of probabilities. For example, the trained subsystem A 240 may be able to predict that the word "amount" is preceded by the word "total" with the 30% probability and is followed with the word "tendered" with the 15% probability.

In some implementations, the output feature vector representations vec(x,y) may be independent of the specific location (x,y) of the symbol sequence SymSeq. More specifically, the coordinates (x,y) of the symbol sequence SymSeq(x,y) may serve as a geometric identifier of the sequence, but its vector representation vec(x,y) may be the same regardless of where in the image the sequence is located. For example, the subsystem A 240 may assign the same probabilities that various character sequences SymSeq (such as "city," state") are found in the proximity of the word "street." In other implementations, the vector representations vec(x,y) of the same symbol sequence SymSeq may differ depending on the location of the sequence within the document (or within the document image 210). For example, the output of the subsystem A 240—the vector representations of a word, e.g., "escrow"—may vary depending on the location (x,y) of the word inside the document image 210. Accordingly, the vector representation of the word "escrow" may be closer (in the vector space) to representations of one set of words, if the word "escrow" is encountered in the middle of the document, but closer to representations of a different set of words, if the word escrow is found near the bottom of the document. The vector representations of a particular word may further depend on the type of the document. For example, the word "amount" may be represented differently in a real estate contract and in a purchasing order.

As a result, if M symbol sequences (characters, punctuation marks, words, sentences) are identified in the document image 210 and input into the subsystem A 240, the output of the first subsystem may be a set of M vectors (feature vectors) {vec(x,y)}. Each of the M vectors vec(x,y) may depend on the context of the whole document—the type of the document, the number of words in the document, the layout of text in the document, the locations of some or all words in the document, and so on.

The vector space for vectors vec(x,y) may have a number of dimensions N chosen based on the complexity of the document. In some implementations, N may be equal to 128 (32, 64, or any other number). The number N may be chosen to be greater to represent symbol sequences of a complex document and, conversely, smaller for simpler documents having limited dictionary of words. For a given number of dimensions N, each vector may have N components, vec(x, y)=($z_1, z_2, \ldots z_N$), wherein $z_j$ may be a binary number, a decimal number, or any other number accessible to a computer. In some implementations, some of the vectors vec(x, y) determined by the subsystem A 240—e.g., shorter words or punctuation marks—may have fewer than N numbers. In such implementations, the remaining components of the vector may be assigned zero vales, so that the overall length of all vectors may be the same.

The output of the subsystem A 240 may be schematically illustrated as a parallelepiped (cube) 250 composed of the components of individual vectors in the set {vec(x,y)}. Along the in-plane directions x and y, the area of the document image 210 may be discretized into p cells along the direction of x and s cells along the direction of y (e.g., p=32 and s=64, in one exemplary implementation). A word (character, sentence) centered over a particular cell (x,y) may have its vector representation vec(x,y)=($z_1, z_2, \ldots z_N$) visualized as a sequence of blocks (cells) stacked along the third direction, as shown schematically in FIG. 2 for a corner vector. Other vectors may be similarly stacked into other cells of the parallelepiped 250 herein referred as the "cube" even though it should be remembered that the number of cells along each of the three directions may be different from the number of cells along the other two directions, with s×p×N being the total number of cells in the "cube." To form the cube, the function Map (e.g., Gather) may be deployed.

Some of the cells (or vertical stacks) of the cube 250 may be empty (e.g., filled with zeros). For example, the cells stacked above the coordinates (x,y) that correspond to empty spaces of the document image 210 may have all zeros. A row (along the x-direction) or a column (along the y-direction) may have all zeros for all its vectors if such a row or a column does not contain any characters (e.g., falls between the lines of the text). Even those rows/columns that contain characters may have some (or even most) of its cells filled with zeros. For example, if a j-th row contains ten words, and the horizontal dimension of the document image 210 is discretized into 32 cells, only 10 non-zero vectors vec(x,y) may be present in this row, interspaced with 22 null vectors. In some implementations, vectors(x,y) that do not have at least one non-zero component may be eliminated from the cube.

The cube 250 having s×p×N cells containing a set {vec (x,y)} of M identified vectors corresponding to identified symbol sequences may be input to the subsystem B 260 for vector recalculation {vec(x,y)}→{VEC (x,y)} in view of the global context of the whole document. The subsystem B 260 may have one or more neural networks (as explained below, in reference to FIG. 3), which may modify the components of the vector representations vec(x,y) of the symbol sequences in view of all other vectors of the cube 250. As a result, the recalculated values $VEC(x,y)=(Z_1, Z_2, \ldots Z_{2N})$ may account for the context of the entire document. More specifically, the recalculated values $VEC(x,y)=(Z_1, Z_2, \ldots Z_{2N})$ output by the subsystem B 260 may account for the presence of all other symbol sequences in the document as well as the content of each of these symbol sequences. Additionally, the subsystem B 260 may perform determination of a set of association values {U(x,y; x',y')} corresponding to previously identified connections, as shown in FIG. 1C, between symbol sequences SymSeq(x,y) and SymSeq (x',y'). Initially, all association values may be set to zero (or any other fixed number, e.g., 0.5), and may be calculated together with the recalculated values {VEC(x,y)} so that the set of output values {U(x,y; x',y')} takes into account the context of the entire document.

The new cube 270 containing the set of the recalculated vectors {VEC(x,y)} may be input on the subsystem C 280 to predict a class of each symbol sequence identified in the document image 210. In some implementations, the block detection engine 111 can use the machine learning model(s) 114 to generate hypotheses about symbol sequences SymSeq 220 of the document (represented with the set of vectors {VEC(x,y)}) belonging to various blocks of associated symbol sequences in the input document 210, as described in more detail below in reference to FIGS. 4A-C. The classes of symbol sequences may be "vendor name," "type of merchandize," "quantity of merchandize," "order number," "type of shipment," "place of delivery," "date of the order," "payment type," and so on. In some implementations, various classes that are expected to be found in the input document 210 may be pre-determined for at least some of the document types and input into the third subsystem 280 as a set of external parameters. In other implementations, various classes that may be present in the document may be determined by the third subsystem 280, which may be trained to ascertain the type of the input document 210 (e.g., "invoice," "order," "bill," etc.) and anticipate the classes of the symbol sequences that may likely be present in the determined type of the input document.

Some of the components illustrated in FIG. 2 may be combined. For example, subsystems A, B, and C may be realized as a single neural network, in one implementation. In some implementations, subsystems A and B may be realized as a single network while subsystem C may be realized as a separate network. Similarly, in some implementations, subsystems B and C may be realized as a single network while subsystem A may be realized as a separate network. In those implementations where multiple subsystems are realized by a combined single network, the functions of different subsystems in the combined network may be implemented by separate dedicated layers or by shared layers, or by some combination thereof.

Figure 3:
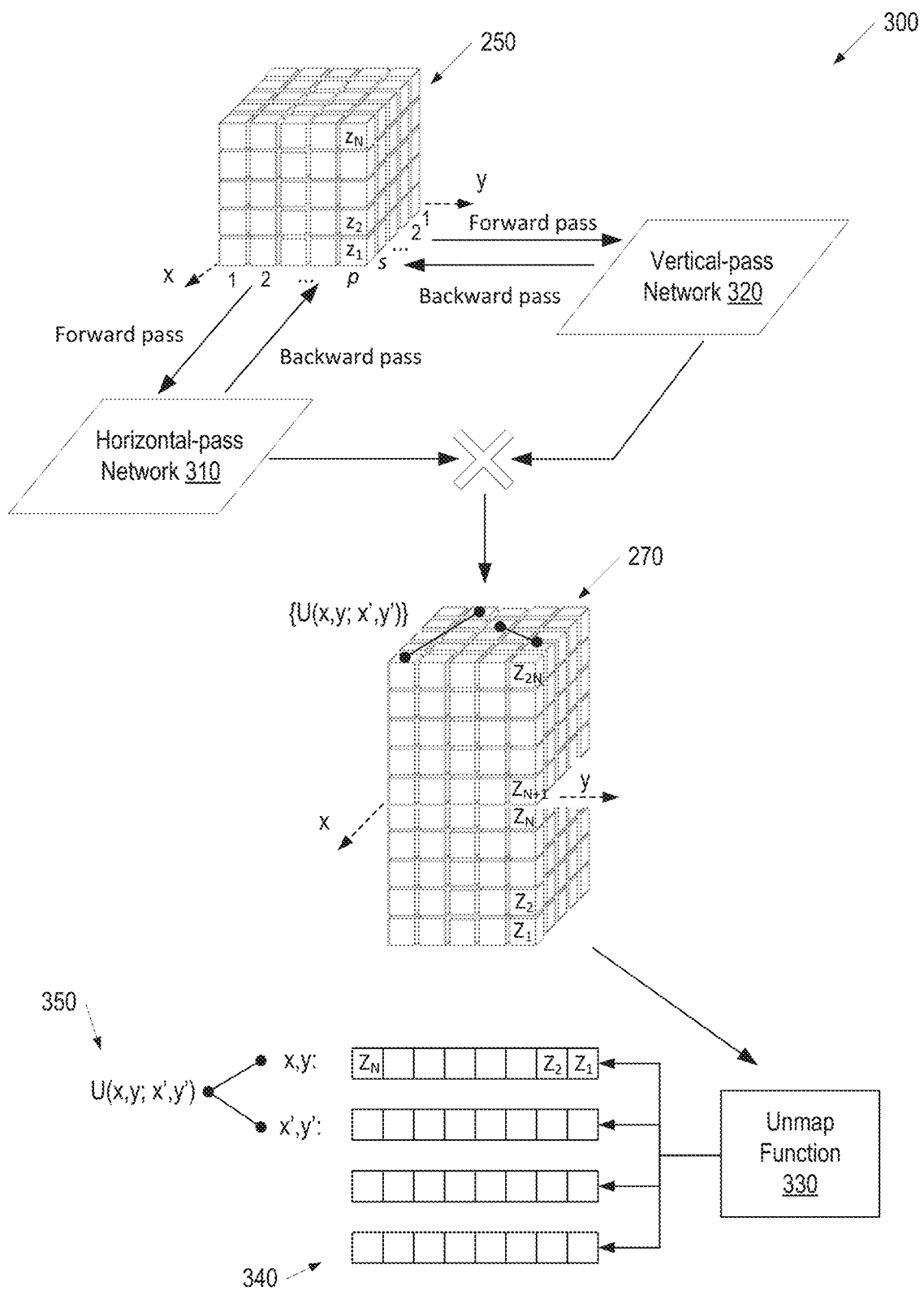
FIG. 3 is a schematic diagram illustrating an example neural network subsystem that determines association values and recalculates vector representations of various symbol sequences of an input document based on the global document context, in accordance with some implementations of the present disclosure.

FIG. 3 is a schematic diagram illustrating an example neural network subsystem 300 that determines association values and recalculates vector representations of various symbol sequences of an input document based on the global document context, in accordance with some implementations of the present disclosure. The neural network subsystem 300 may be the subsystem B 260, in one implementation. The neural network subsystem 300 may be implemented by the block detection engine 111.

The cube 250 containing a set {vec(x,y)} of vectors corresponding to identified symbol sequences SymSeq may be input into the subsystem 300. Additionally, the input into the subsystem 300 may include between symbol sequences previously identified as illustrated in FIG. 1C. Some symbol sequences SymSeq(x,y) may have connection to one or more other symbol sequences SymSeq(x',y'). Some symbol sequences may have no connections. Initially, a set of association values {U(x,y; x',y')} corresponding to identified connections between symbol sequences SymSeq(x,y) and SymSeq(x',y') may be set to some fixed values (such as 0 or 0.5) that are the same for all connections. The subsystem 300 may include one or more neural networks, each network containing a plurality of layers of neurons. In some implementation, the subsystem 300 may include two neural networks, a horizontal-pass network 310 and a vertical-pass network 320. In some implementations, the horizontal-pass network 310 and the vertical-pass network 320 may be long short-term memory (LSTM) networks. In other implementations, the horizontal-pass network 310 and the vertical-pass network 320 may be RNNs or attention-based LSTM networks.

The horizontal-pass network 310 and the vertical-pass network 320 may perform a plurality of passes along the horizontal (x) and vertical (y) dimensions of the cube 250. More specifically, the horizontal-pass network 310 may select, in consecutive iterations, each one of the s columns of the base (the bottom plane of cells) and the vertical-pass network 320 may similarly select each one of the p rows of the base. The null vectors (those that have all zeros) may be ignored, e.g. skipped over. The horizontal-pass network 310 and the vertical-pass network 320 may recalculate vector components, $vec(x,y)=(z_1, z_2, \ldots z_N) \rightarrow VEC(x,y)=(Z_1, Z_2, \ldots Z_N)$, for some or all of the vectors {vec(x,y)} so that the values $VEC(x,y)=(Z_1, Z_2, \ldots Z_N)$ are recalculated based on the values of all vectors {vec(x,y)} of the document and, therefore, the new values {VEC(x,y)} may depend on the context (type, content) of the entire document.

In one exemplary implementation, the vector recalculation may be performed as follows. The horizontal-pass network 310 may iteratively select consecutive values of columns j, such that 1≤j≤s. For each j, the horizontal-pass network 310 may identify a plane of vector components $z_1(x_j,y_k), z_1(x_j,y_k), z_N(x_j,y_k)$ located in the cell of the cube 250 having the same column index j but various possible row indices k. The horizontal-pass network 310 may then use parameters (e.g., weights and biases) of the network 310 to modify the values of the vector components $z_1(x_j,y_k)$, $z_1(x_j,y_k), z_N(x_j,y_k)$ based on the values in the preceding plane, $z_1(x_{j-1},y_k), z_1(x_{j-1},y_k), z_N(x_{j-1},y_k)$, or a fixed number (two, three, ten, or any other number) of preceding planes. In some implementations, the values for the column plane j may be recalculated based on all preceding planes, having indices from 1 to j−1. After recalculation of the values of the vector components $z_1(x_j,y_k), z_1(x_j,y_k), z_N(x_j,y_k)$ for the column-plane j, the horizontal-pass network 310 may proceed with recalculating the values of the vector components for the next plane, $z_1(x_{j+1},y_k)$, $z_1(x_{j+1},y_k)$, $z_N(x_{j+1},y_k)$, and so on, until all columns of the cube 250 are recalculated.

The horizontal-pass network 310 may perform multiple horizontal passes as described above. In some implementations, some of the passes may be performed in the backward direction, e.g., starting with j=s and proceeding towards smaller values of j until the column j=1 is reached and recalculated.

The vertical-pass network 320 may likewise select, in consecutive iterations, each one of the p rows of the base plane of cells of the cube 250 and similarly recalculate the vector components based on the values of all vectors {vec (x,y)} of the document. For example, the vertical-pass network 320 may iteratively select consecutive values of rows k, such that 1≤k≤p. For each k, the vertical-pass network 320 may identify a plane of vector components $z_1(x_j,y_k)$, $z_1(x_j,y_k)$, $z_N(x_j,y_k)$ located in the cell of the cube 250 having the same row index k but various possible column indices j. The vertical-pass network 320 may then use parameters (e.g., weights and biases) of the network 320 to modify the values of the vector components $z_1(x_j,y_k)$, $z_1(x_j,y_k)$, $z_N(x_j,y_k)$ based on the values in the preceding plane, $z_1(x_j,y_{k-1})$, $z_1(x_j,y_{k-1})$, $z_N(x_j,y_{k-1})$, or a fixed number (two, three, ten, or any other number) of preceding planes. In some implementations, the values for the row-plane k may be recalculated based on all preceding row-planes, having indices from 1 to k−1. After recalculation of the values of the vector components $z_1(x_j,y_k)$, $z_1(x_j,y_k)$, $z_N(x_j,y_k)$ for the row-plane k, the horizontal-pass network 310 may proceed with recalculating the values of the vector components for the next plane, $z_1(x_j,y_{k+1})$, $z_1(x_j,y_{k+1})$, $z_N(x_j,y_{k+1})$, and so on, until all rows of the cube 250 are recalculated.

When the horizontal-pass network 310 and the vertical-pass network 320 perform multiple forward and backward passes as described above, to determine the recalculated values {VEC(x,y)}, the association values {U(x,y; x',y')} may be similarly recalculated. After each forward and/or backward pass, the association values {U(x,y; x',y')} may be adjusted. As a result, some of the connections may have association values decreasing from the initial values whereas other connection may have increasing association values. A higher (lower) value U(x,y; x',y') may indicate a more (or less) likely association between symbol sequences SymSeq (x,y) and SymSeq(x',y').

The parameters of the horizontal-pass network 310 may be different from the parameters of the vertical-pass network 320. The parameters of the two networks may be determined during a training phase by selecting one or more training inputs 122, determining the output of the combined network (subsystem 300), comparing the output with training outputs 124 and backpropagating errors through the layers of networks on the horizontal-pass network 310 and the vertical-pass network 320.

During the training phase, the horizontal-pass network 310 and the vertical-pass network 320 may perform a plurality of passes until the error of the output of the subsystem 300 falls below some pre-determined error. The passes by the horizontal-pass network 310 and the vertical-pass network 320 may be performed in a variety of orders. For example, in one implementation, the first pass may be a forward pass by the horizontal-pass network 310, the second path may be a backward path by the horizontal-pass network 310, the third pass may be a forward path by the vertical-pass network 320, the fourth pass may be a backward path by the vertical-pass network 320, and so on. This process may be repeated a number of times. Alternatively, in another implementation, the first pass may be a forward pass by the horizontal-pass network 310, the second path may be a forward path by the vertical-pass network 320, the third pass may be a backward path by the horizontal-pass network 310, the fourth pass may be a backward path by the vertical-pass network 320, and so on. In another implementation, each of the two networks may perform multiple (e.g., two, three, or more) passes in the same direction (forward or backward), before the same network may perform multiple passes in the opposite direction, or before the other networks performs multiple passes (in either direction). A person skilled in the technology will appreciate that it is possible to realize a virtually unlimited number of various combinations of the two networks performing passes in the two directions.

The result of the training phase may be a set of parameters (e.g., biases and weights) for the horizontal-pass network 310 and a set of parameters for the vertical-pass network 320. The two sets may be different. Furthermore, each of the two networks may have a set of parameters that is different for forward and backward passes. Additionally, while in some implementations the parameters (e.g., for backward passes of the horizontal-pass network 310) may be independent of where the recalculated column-plane is located, in other implementations, the parameters may depend on such locations. For example, the parameters may be different for column-planes (row-planes) located near the edges of the document from the planes located near the middle of the document.

The output of the horizontal-pass network 310 and the output of the vertical-pass network 320 may be concatenated to produce a recalculated cube 270. (The concatenation operation is depicted on FIG. 3 with a white cross.) The concatenated vectors may have recalculated values VEC(x, y)=($Z_1$, $Z_2$, . . . $Z_N$, $Z_{N+1}$, $Z_{2N}$), having first N components that represent the output of the horizontal-pass network 310 and the last N components that represent the output of the vertical-pass network 320 (or vice versa). For example, if the original vectors vec(x,y) that form the (input) cube 250 have 128 components, the recalculated vectors VEC(x,y) that form the (output) cube 270 may have 256 components, in one exemplary implementation. Components of the recalculated cube 270 that have identified connections are indicated with linked dots in FIG. 3. Each connection may have its own association value U(x,y; x',y').

In the prediction phase, the subsystem 300 may operate in the same order of combinations as in the training phase, in one implementation. In other implementations, the number of passes in the prediction phase may be less (or greater) than in the training phase. For example, if the number of documents to be analyzed is significant, the number of passes (per document) in the prediction phase may be significantly reduced compared with the training phase.

During the prediction phase, upon the completion of a predetermined number of passes (the number of passes may be predetermined during training phase, as the number sufficient to achieve a required accuracy), the subsystem 300 may output the cube 270 having the recalculated values of the vector components VEC(x,y)=($Z_1$, $Z_2$, . . . $Z_N$, $Z_{N+1}$, $Z_{2N}$). An Unmap (e.g. Scatter) function 330 may unmap the recalculated cube 270 into a set of recalculated unmapped vectors 340 having the original length (N components). For example, in some implementations, the Unmap function 330 may combine two components of the vector ($Z_1$, $Z_2$, . . . $Z_N$, $Z_{N+1}$, $Z_{2N}$), e.g., according to $Z_k+Z_{N+k} \rightarrow Z_k$, or according to some other mapping scheme that reduces the number of vector components from 2N to N. In other implementations, the Unmap function 330 may first eliminate zero components of the vector $(Z_1, Z_2, \ldots Z_N, Z_{N+1}, Z_{2N})$ and select the first N (the last N, the largest N, etc.) remaining components. In another implementation, a dense neural network layer having 2N inputs and N outputs may reduce the vector $VEC(x,y)=(Z_1, Z_2, \ldots Z_N, Z_{N+1}, Z_{2N})$ into a reduced vector $VEC(x,y)=(Z_1, Z_2, \ldots Z_N)$. The reduced (unmapped) vectors 340 may include the coordinate of the corresponding symbol sequences SymSeq. In some implementations, the reduction of the length of each of the vectors from 2N to N may involve just that one vector; namely, determination of the components of the reduced vector identified by coordinates (x,y) may not involve components of other vectors (e.g., identified by different coordinates). Because the unmapped vectors 340 output by the subsystem 300 are recalculated based on values of all vectors of the document, the unmapped vectors 340 depend on the context of the entire document. In addition to the unmapped vectors, the output of the subsystem 300 may include a set of association values {U(x,y; x',y')} 350 between identified connections.

Figure 4A:
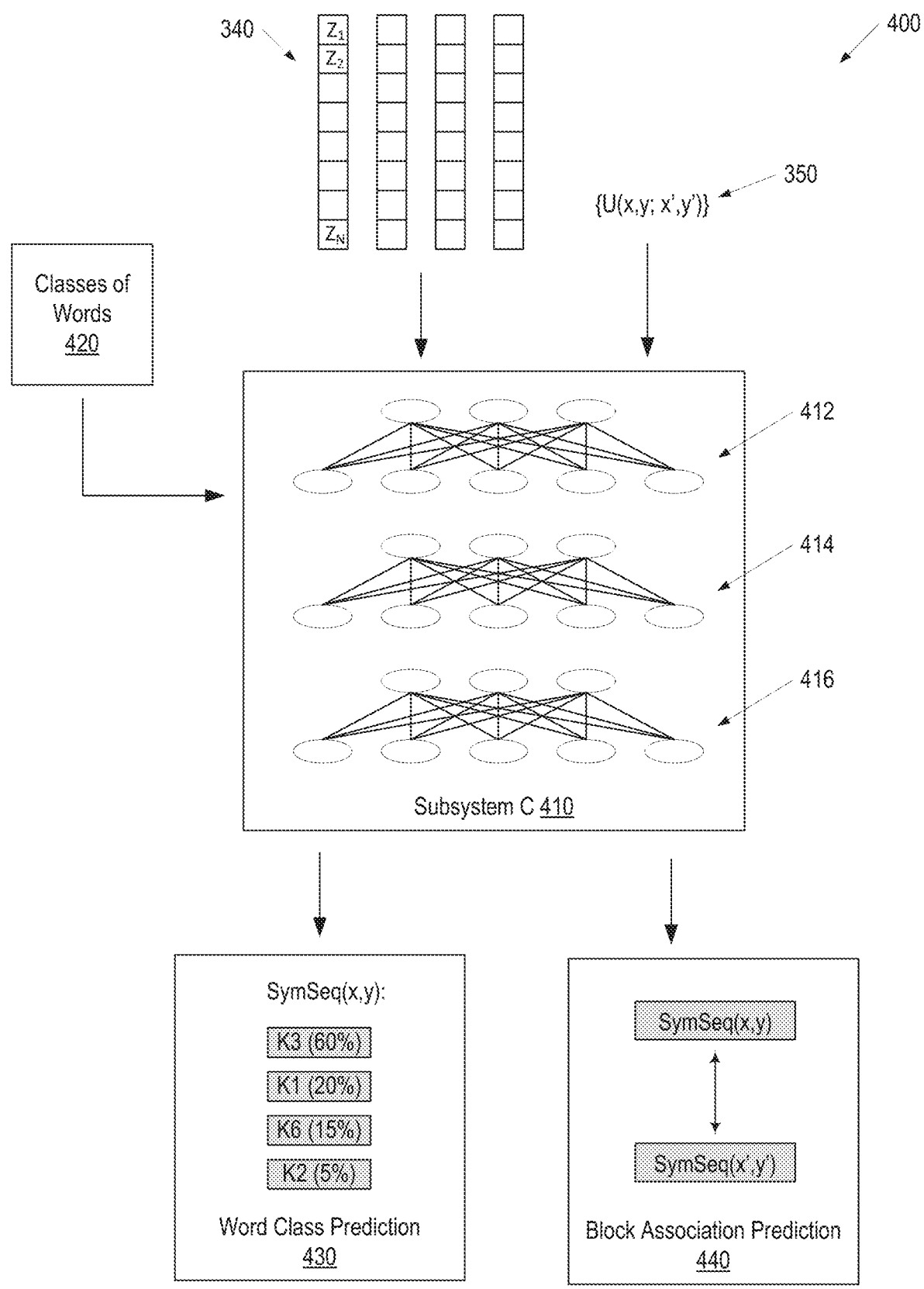
FIG. 4A is a schematic diagram illustrating operations of an example neural network subsystem that predicts classes of symbol sequences and determines block associations, in accordance with some implementations of the present disclosure.

FIG. 4A is a schematic diagram illustrating operations 400 of an example neural network subsystem 410 that predicts classes of symbol sequences and determines block associations, in accordance with some implementations of the present disclosure. The neural network subsystem 410 illustrated in FIG. 4A may be the subsystem C 280, in one implementation. The neural network subsystem 410 may be implemented by the block detection engine 111. The neural network subsystem 410 may use, as input, the output of the subsystem B (e.g., subsystem 300). More specifically, the neural network subsystem C 410 may input the recalculated values 340 of the vector components $VEC(x,y)=(Z_1, Z_2, \ldots Z_N)$ corresponding to the identified symbol sequences SymSeq(x,y). The neural network subsystem C 410 may also input the calculated association values U(x,y; x',y') 350 corresponding to prospective associations between symbol sequences SymSeq(x,y) and SymSeq(x',y'). The subsystem C 410 may have one or more fully-connected/dense neuron layers, e.g., layers 412, 414, 416. Some of the fully connected layers may use a softmax function. One or more fully-connected layers 412, 414, and/or 416 may be connected to each other by layers that are not fully-connected, in some implementations.

The subsystem C 410 may classify each of the symbol sequences SymSec(x,y) into one of a plurality of classes, which may be predefined, in some implementations. Each of the predefined classes may correspond to one of the types of symbol sequences (words) to be detected (which may by the types that are of interest to the client). In some implementations, the subsystem 410 may use additional input 420 that may include listings of predefined classes of words for various types of documents. For example, in some implementations, the input 420 may contain information that an invoice document may include such classes as "seller," "buyer," "seller's address," "buyer's address," "type of goods," "quantity of goods," "method of payment," "deposit amount," "delivery date," "delivery date," "signature," and so on. In some implementations, classification among classes may be based on semantic meanings of words and group words having similar meanings into a single class. In some implementations, where the same word may have multiple meanings, classification may also take into account whether the word is used as a verb or as a noun and a context in which the word is being used (e.g., the other words used within the same line, paragraph, and document). In some implementations, classes may be based on a subject area they refer to. For example, words may be grouped into "financial," "geographic," "product-related," etc., classes. In some implementations, the input 420 may be provided as part of the training input(s) 122 and training output(s) 124 and the subsystem 410 may determine the number and classes of words encountered in various types of documents as part of the training process (phase).

In order to classify symbol sequences, the subsystem C 410 may generate hypotheses that some or each of the identified symbol sequences—described by the corresponding vectors 340—belong to one of the classes. The subsystem C 410 may further determine probabilities of specific symbol sequences belonging to various classes. The word class prediction output 430 of the subsystem C 410 may include an association for each of the symbol sequences SymSeq(x,y) with various classes K1, K2, K3, K4, . . . For example, as indicated in FIG. 4A, the associations may be quantified by assigning various probabilities for the sequences SymSeq(x,y) to belong to the corresponding classes. For example, the subsystem C 410 may determine that a particular sequence SymSeq(x,y) may belong to class K3 with 60% probability, to class K1 with 20% probability, to class K6 with 15% probability, and to class K2 with 5% probability.

To determine the word class predictions 430 for various symbol sequences of the document, the subsystem C 410 may first generate a plurality of hypotheses identifying various SymSeq(x,y) as belonging to a variety of classes Kn. For example, a hypothesis may be that a set of several words that are located in the vicinity of each other (e.g., in the same line) may belong to the same block (e.g., vendor's address). Another hypothesis may be that some of the same words may belong to a buyer's address. A hypothesis for a word may be generated based on one or more features of the word (or sentence) that is known with certainty, such as a location of the word, a number of characters in the word, etc. A hypotheses generator implemented by the subsystem C 410 and/or the block detection engine 111 may generate multiple hypothesis for each SymSeq(x,y) based on the known features of this sequence.

A set of generated hypotheses may then be input into one or more neural networks of the subsystem C 410 to evaluate/test the generated hypotheses and to assign probability values to each generated hypothesis. A testing function may be used for hypotheses testing. The testing function may be determined based on evaluation of training inputs 122, comparison of the actual outputs of the subsystem C 410 with the training outputs 124 and adjustment of parameters of the testing function in such a way as to minimize the difference between the actual outputs of the subsystem 410 and the training outputs 124. Training of the testing function may be performed by using gradient boosting techniques, decision tree methods, or similar methods.

After selection of the most probable hypotheses, the symbol sequences SymSeq(x,y) may be classified among classes Kn according to the hypotheses that are determined to have the highest probabilities.

In addition to outputting word class predictions 430, the subsystem C 410 may output block association predictions 440. To determine most probable associations between various words of the document, the subsystem C 410 may generate hypotheses that some of the words belong to blocks of associated words. The hypotheses may be based on the association values U(x,y; x',y') 350 between previously identified connections, as illustrated in FIG. 3.

Figure 4B:
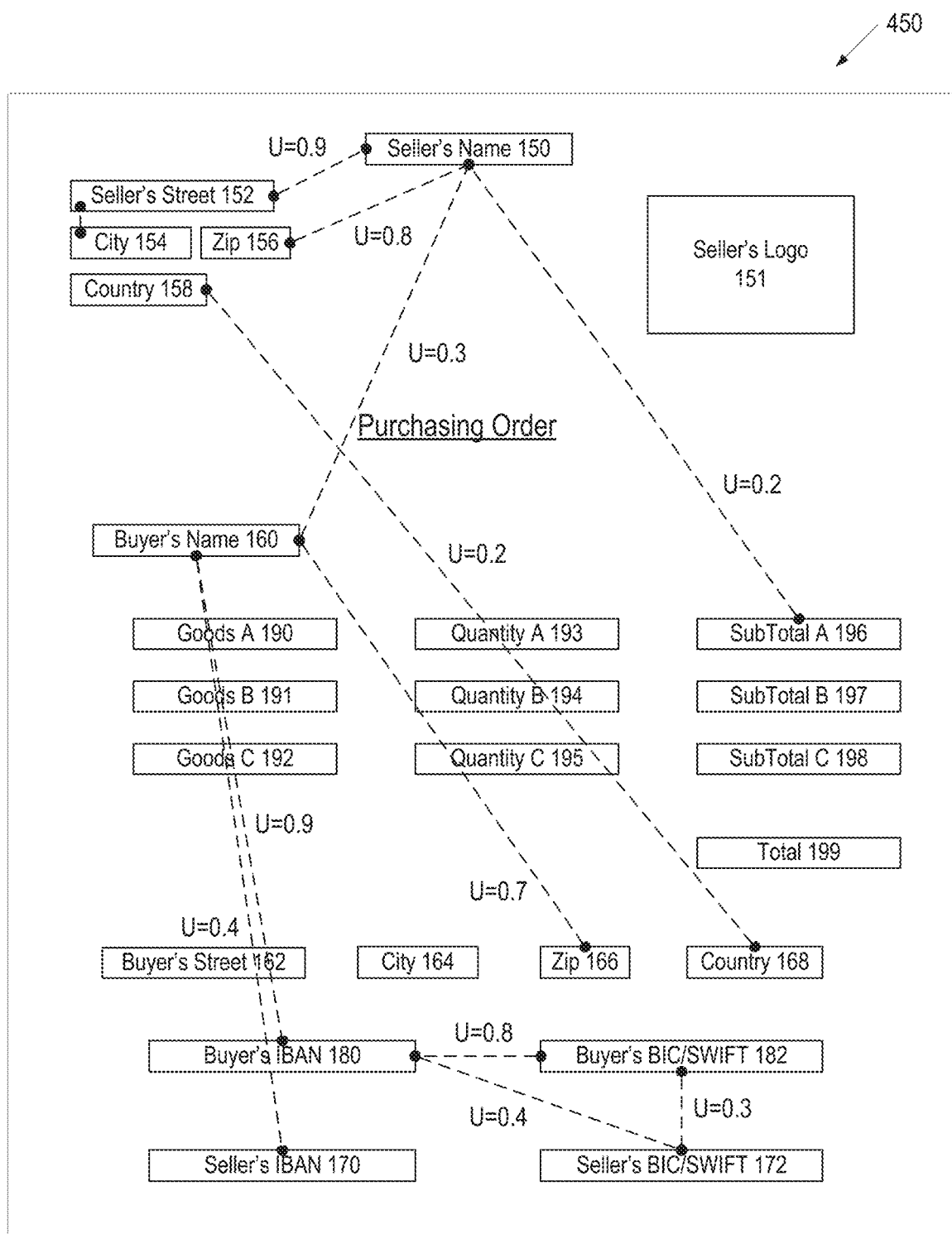
FIG. 4B is an exemplary illustration of block-level hypotheses used for prediction of blocks of associated symbol sequences in a target document, in accordance with some implementations of the present disclosure.

FIG. 4B is an exemplary illustration 450 of block-level hypotheses used for prediction of blocks of associated symbol sequences in a target document, in accordance with some implementations of the present disclosure. Shown are block-level hypotheses indicating different prospective associations of various symbol sequences of the target document 145. Also shown are the association values U(x,y; x',y') 350, as may be generated by the subsystem B 260. The association values 350 may indicate a likelihood that symbol sequences identified by the coordinates (x,y) and (x',y') belong to a same block of associated symbol sequences, with the higher values U indicating a higher likelihood, in one implementation. For example, the association value U=0.9 between buyer's name 160 and buyer's MAN 180 may indicate a high probability that buyer's name and buyer's MAN belong to a same blocks of associated words. Similarly, the association value U=0.3 between seller's name 150 and buyer's name 160 may indicate a much lower probability of association of seller's name and buyer's name. The fact that the ratio of the two association value is equal to three in this example does not necessarily indicate that the U=0.9 association is three times likely to occur than the U=0.3 association. In some implementation, a probability of an association may be a non-linear function of U. In the illustration shown in FIG. 4B, association values vary between 0 and 1. In other implementations, association values may vary between 0 and 100, or between any other limits.

Based on association values characterizing prospective associations between various words in the document, the subsystem C 410 may generate a number of block-level hypotheses, where each block-level hypothesis represents a prospective block of associated words. The subsystem C 410 may further compute, for each prospective block association, a block-level value representative of a likelihood that this prospective block corresponds to an actual association of words. The block-level value may be determined using association values of various connections between words of the prospective block. For example, the subsystem C 410 may generate a first hypothesis that buyer's name 160, buyer's zip 166, buyer's MAN 180, and buyer's BIC/SWIFT 182 represent a first prospective block and assign to this block a block-level value W=0.9+0.7+0.8=2.4. The subsystem C 410 may further generate a second hypothesis that buyer's name 160, seller's name 150, subtotal A 196, and seller's MAN 170 represent a second prospective block and assign to this block a block-level value W=0.2+0.3+0.4=0.9. The higher block-level value of the first block-level hypothesis may indicate a higher likelihood that the first prospective block is an actual block of associated words, compared to the likelihood for the second prospective block. In some implementations, the subsystem C 410 may generate thousands or tens of thousands (or more) block-level hypotheses, with each word potentially included into many hypotheses.

Figure 4C:
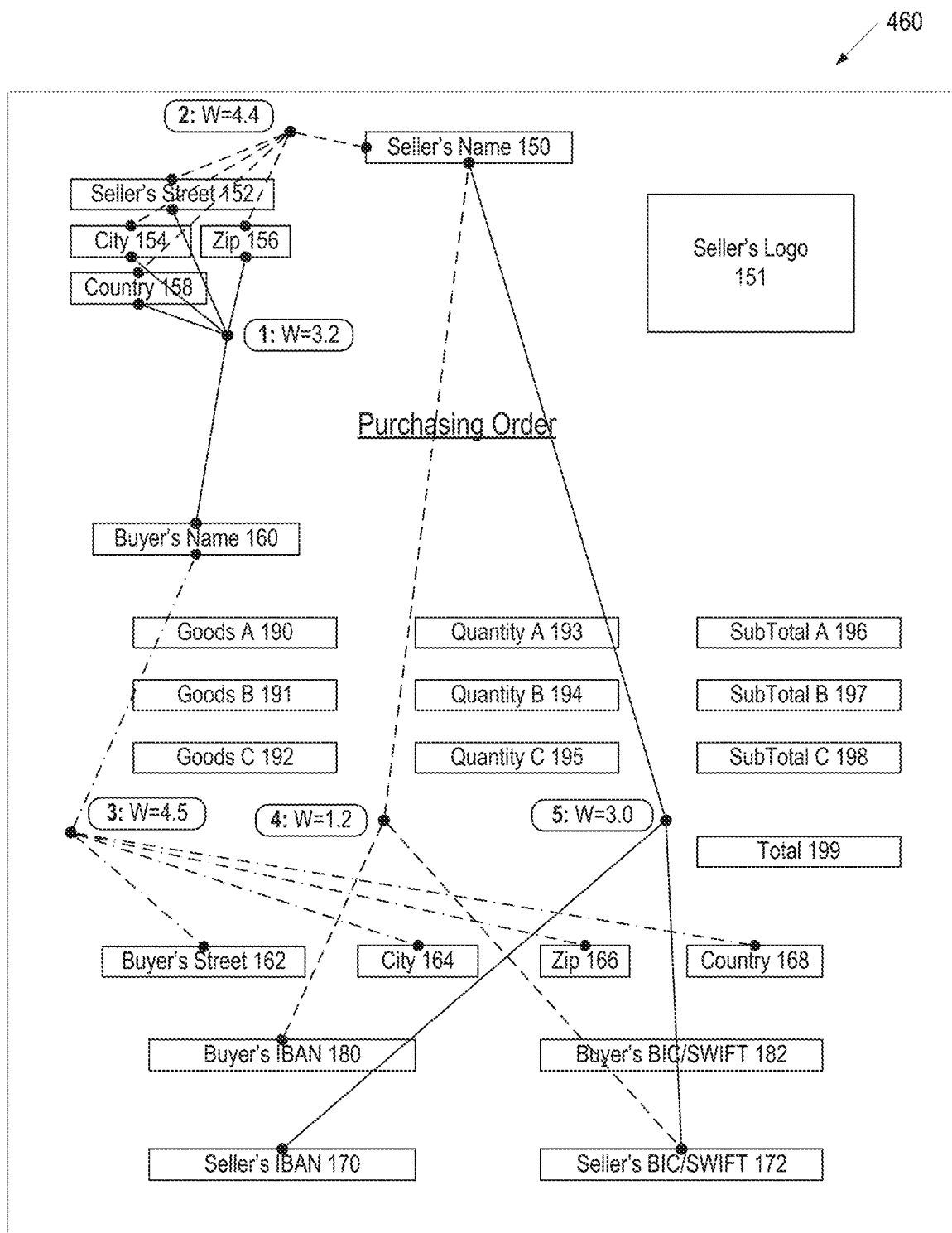
FIG. 4C is an exemplary illustration of document-level hypotheses used for prediction of blocks of associated symbol sequences in a target document, in accordance with some implementations of the present disclosure.

FIG. 4C is an exemplary illustration 460 of document-level hypotheses used for prediction of blocks of associated symbol sequences in a target document, in accordance with some implementations of the present disclosure. Shown are document-level hypotheses indicating different prospective blocks of associated symbol sequences of the target document 145. Also shown are the block-level values W, as may be generated by the subsystem C 280, as described above. For example, a prospective block 1 (whose associations are indicated by the solid lines) may include seller's address 152-158 and buyer's name 160 may have a block-level value W=3.2 whereas a prospective block 2 (dashed lines) may have a block-level value W=4.4 indicating a higher likelihood of occurrence. Similarly, other hypotheses may include prospective blocks 3 (dot-dashed lines), 4 (dashed lines), 5 (solid lines), and so on, each having its block-level value.

In some implementations, the block-level values W may be a sum of association values U for various words of the prospective block identified in the hypothesis. To reflect relative likelihoods (probabilities) of occurrence of prospective blocks that have unequal numbers of associated words, in some implementations, the block-levels values W may be rescaled with the number of words. For example, the block-level value W of prospective block 2 may be divided by the total number of words in it (five) W→4.4/5=0.88 and the block value W of prospective block 5 may be similarly rescaled W→3.0/3=1.0. This may allow to better reflect that prospective block 2 has a higher likelihood of occurrence despite having the unscaled block-level value (3.0) that is lower that the unscaled value (4.4.) of block 1.

In some implementations, the block-level values W may further take into account classes of words predicted by the word class prediction output 430. For example, if all words in a prospective block are identified as belonging to the same class, the corresponding block-level value W may be boosted by some fixed amount, e.g., W→W+1.0. If only some of the words belong to the same class whereas some words belong to different classes, the boost may be reduced (e.g., W→W+0.7) from the maximum boost value by some penalty value (0.3, in this example) depending on how many words have mismatched classes. (In other implementations, the maximum boost value may be some other number.) The higher boost values may be used where class matching is more important than word associations. On the other hand, lower boost values may be used where word associations are of a greater significance. A person skilled in the art will recognize that there is virtually an unlimited number of possibilities to give relative weights to class matching and word associations. Such a person will also recognize a virtually unlimited number of ways in which association values U may be used to compute the block-level values W. In some implementations, the boost values and the class mismatch penalties may be determined by a neural network, e.g. by one or more neuron layers of the subsystem C 410, using standard machine-learning training methods.

After identification of a plurality of block-level hypotheses, the subsystem C 410 may generate one or more document-level hypotheses by ascertaining consistency among various block-level hypotheses and computing a likelihood that one or more block-level hypotheses may be joined in the same document. In some implementations, only hypotheses in which no word belongs to more than one block-level hypothesis may be considered. For example, a first document-level hypothesis may include prospective block 1 (a first block-level hypothesis) and prospective block 5. A second document level hypothesis may include prospective block 2 and prospective block 3. A third block-level hypothesis may include prospective block 2 and prospective block 3, and prospective block 4. On the other hand, a document-level hypothesis that combines prospective block 2 and prospective block 5 may be prohibited since seller's name 150 is found in both block-level hypotheses.

In other implementations, document-level hypotheses with shared words may still be considered, but may be assigned overlap penalties. In yet other implementations, where a word may potentially be included in multiple blocks, no overlap penalties may be assigned. For example, a client may be interested in parsing a target document into multiple logical blocks—e.g., "financial info," "shipping info," etc., —in all of which the name of the buyer may be included.

From the set of generated document-level hypotheses, the subsystem C 410 may determine, based on the block-level values W for the prospective block included in a respective document-level hypothesis, the most likely document-level hypothesis that predicts how various words in the document are distributed among blocks of associated words. In some implementations, a document-level hypothesis with a highest document-level probability value Z may be selected. The probability value Z may be computed as a sum $Z=\Sigma_j W_j$, of block-level values W of all prospective blocks included in the respective hypothesis (possibly with overlap penalties subtracted, if applicable). In some implementations the probability value Z may be computed as $Z=\Sigma_j f(W_j)$, with some function $f(W)$ that need not be a linear function, and may be a polynomial function, a logarithmic function, an exponential function, or any other function. In some implementations, the probability values Z may be uniformly scaled to the interval [0,1] or any other interval.

In some implementations, the probability value Z may also take into account how many words are left out of any prospective blocks, and favor those hypotheses that associate more words into blocks (with, perhaps, lower individual likelihoods) over hypotheses that associate fewer words (but with higher individual likelihoods). This may be achieved, for example, by boosting each Z by a factor that depends on the number of associated words in the corresponding hypothesis (or, conversely, by subtracting penalties based on the number of unassociated words). A person skilled in the art will recognize that there is virtually an unlimited number of possibilities to design such boosting factors (penalties). In some implementations, the boosting factors (penalties) may be determined by a neural network, e.g. by one or more neuron layers of the subsystem C 410, using standard machine-learning training methods.

In one implementation, after the blocks of associated symbol sequences in the document are identified, the information about the identified blocks partitions may be stored, e.g., in repository 120, or any other storage device, including a local or a network (e.g., cloud) storage device. The blocks may be identified by their absolute locations (e.g., coordinates) or relative locations (with respect to other blocks or words). This information may be reused when a subsequent document of the same or a similar type is input for identification of its blocks of associated symbol sequences. In such instances, after OCR of the subsequent document, the blocks may be populated with the symbol sequences Sym-Seq(x,y) of the subsequent document based on their coordinates (x,y), if it has been previously identified that such coordinates (x,y) belong to one or the associated symbol sequences of the block. In such instances, the neural networks may not have to be used for detection of blocks in subsequent documents. In some implementations, to be identified as associated symbol sequences of the same block, the coordinates of the symbol sequences in different documents need not to be coincide exactly, but merely with some pre-determined accuracy. In other implementations, where it may be expected that a subsequent document (or form) may be of a different edition or layout, the blocks of associated words (and their locations) identified for the original document may be used during blocks identification of the subsequent document as hypotheses. Such hypotheses may be tested together with other hypotheses that may be generated by the neural networks, as described above. A new layout of blocks detected in each additional document may be similarly added to the pool of hypotheses for block detection in future documents.

In some implementations, the location of a symbol sequence in a block may be determined based on its placement relative to some other symbol sequences in the same block. For example, placement of the word "tendered" may be defined relative to the location of another symbol sequence, e.g., "total amount."

FIGS. 5-8 are flow diagrams illustrating exemplary methods 500-800 that use global document context for detecting blocks of associated symbol sequences in electronic documents with a complex structure, in accordance with some implementations of the present disclosure. Each of methods 500-800 may be performed by processing logic that may comprise hardware (e.g., circuitry, dedicated logic, programmable logic, microcode, etc.), software (such as instructions run on a processing device), firmware, or a combination thereof. In one implementation, methods 500-800 may be performed by a processing device (e.g. a processing device 902 of FIG. 9) of a computing device 110 and/or a server machine 150 as described in connection with FIG. 1. In certain implementations, methods 500-800 may be performed by a single processing thread. Alternatively, methods 500-800 may be performed by two or more processing threads, each thread executing one or more individual functions, routines, subroutines, or operations of the method. In an illustrative example, the processing threads implementing methods 500-800 may be synchronized (e.g., using semaphores, critical sections, and/or other thread synchronization mechanisms). Alternatively, the processing threads implementing methods 500-800 may be executed asynchronously with respect to each other. Therefore, while FIGS. 5-8 and the associated descriptions list the operations of methods 500-800 in certain order, various implementations of the methods may perform at least some of the described operations in parallel and/or in arbitrary selected orders.

Figure 5:
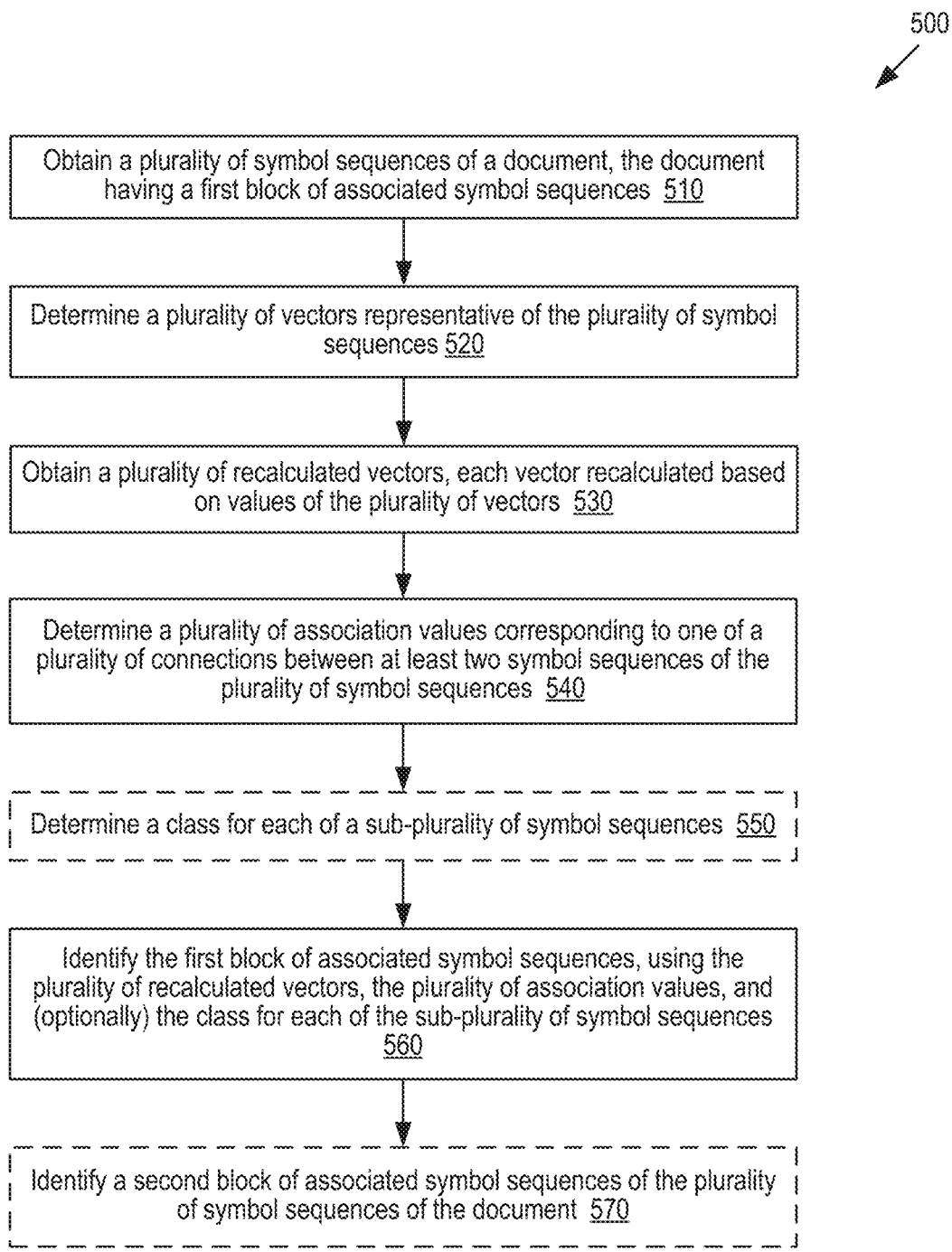
FIG. 5 is a flow diagram illustrating one exemplary method of detecting blocks of associated symbol sequences in an electronic document with a complex structure, in accordance with some implementations of the present disclosure.

FIG. 5 is a flow diagram illustrating one exemplary method 500 of detecting blocks of associated symbol sequences in an electronic document with a complex structure, in accordance with some implementations of the present disclosure. At operation 510, the processing device performing method 500 may obtain a plurality of symbol sequences of a document. Such symbol sequences may include numbers (e.g., dollar amounts), text (letters, words, sentences, paragraphs), special characters, images (logos), elements of tables (lines, cells), or any other symbols that may be identified in the document (e.g., by OCR of its image). Some of the symbol sequences of the document may be associated into one or more blocks. For example, a first block of associated symbol sequences may have two or more symbol sequences that are related to each other, functionally or semantically. Similarly, a second block may have two or more symbol sequences that are not part of the first block. At operation 520, the processing device may determine a plurality of vectors, so that a vector of the plurality of vectors represents one of the plurality of symbol sequences.

At operation 530, the method 500 may continue with the processing device recalculating some or all of the vectors. Some or all of the recalculated vectors may be based on values of several or all of the plurality of vectors. At operation 540, the processing device may process the plurality of identified symbol sequences of the document using a first neural network (e.g., the subsystem B 260). Based on the input of the symbol sequences, the first neural network may determine a plurality of association values, wherein each of the plurality of association values corresponds to one of a plurality of connections between at least two symbol sequences of the plurality of symbol sequences (operation 540).

The method 500 may optionally (as depicted with the dashed box in FIG. 5) continue with the processing device determining (operation 550) a class for each of a sub-plurality of symbol sequences of the document. In some implementations, the sub-plurality may include most (or even all) symbol sequences of the document. In other implementations, the sub-plurality of symbol sequences (for which classes are to be determined) may include only some of the symbol sequences of the document. The method 560 may continue, at operation 560, by identifying, using the plurality of recalculated vectors and the plurality of association values, the first block of associated symbol sequences. In some implementations, determination of the first block of associated symbol sequences may further be based on the class for each of the sub-plurality of symbol sequences, as determined during operation 550. At operation 570, the method 500 may (optionally) continue with the processing device identifying, a second (third, etc.) block of associated symbol sequences of the plurality of symbol sequences of the document.

In some implementations, the processing device performing method 500 may also determine locations of symbol sequences of the first (second, etc.) block of associated symbol sequences and storing the determined locations in a data store. The stored locations may be used for processing of subsequent documents. For example, after obtaining a subsequent document and locating a symbol sequence in the subsequent document, the processing device may determine that the symbol sequence of the subsequent document has a location in the subsequent document that coincides, within a pre-determined accuracy, with one of the locations of the symbol sequences of the first block of associated symbol sequences. The pre-determined accuracy may be a specific distance (e.g., 0.5 cm, 1 cm, and so on) or a distance measured in line widths or line spacings (e.g., one line, two lines, etc.). Based on the determined locations, the processing device may associate the symbol sequences of the subsequent document with the first block of associated symbol sequences.

Figure 6:
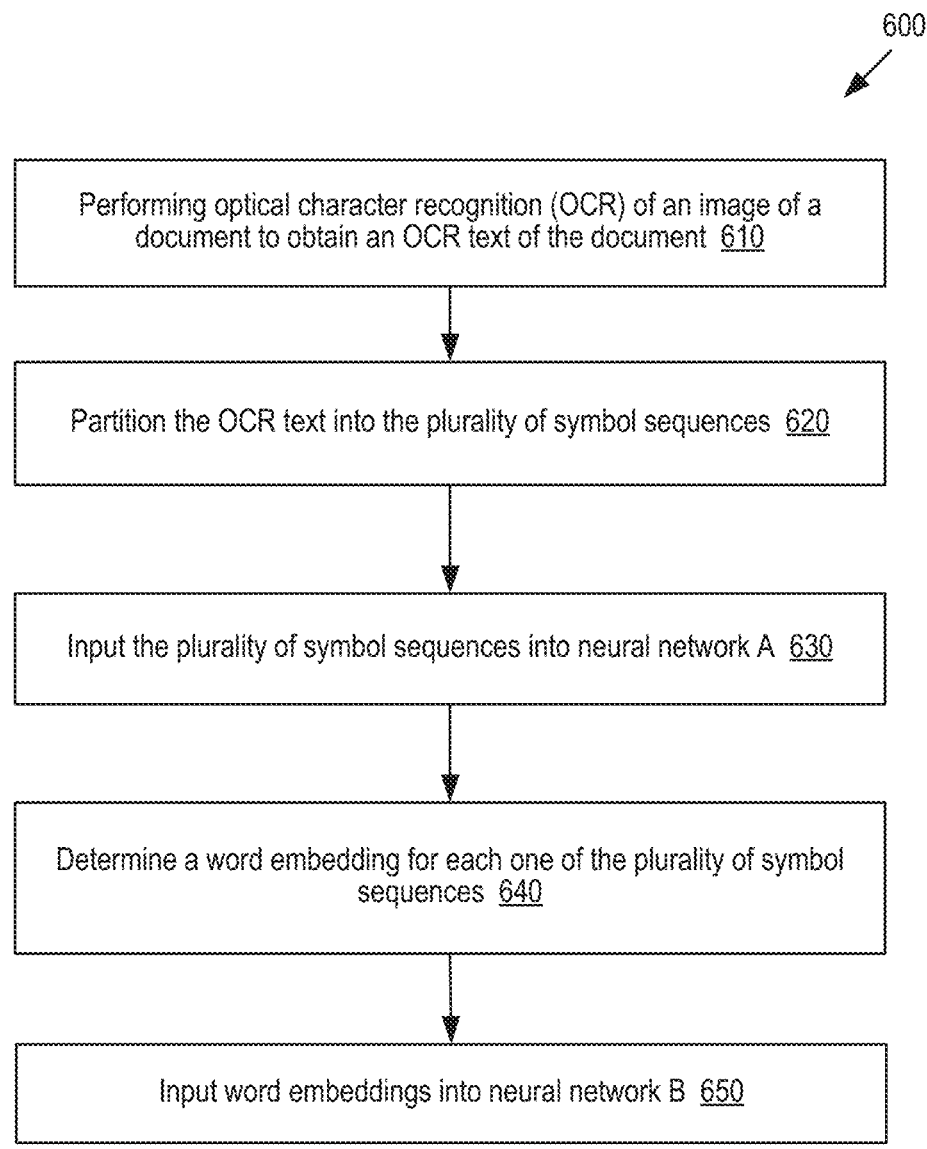
FIG. 6 is flow diagram illustrating one exemplary method that uses neural networks to determine vector representations (e.g., word embeddings) for symbol sequences identified in an image of a document, in accordance with some implementations of the present disclosure.

FIG. 6 is flow diagram illustrating one exemplary method 600 that uses neural networks to determine vector representations (e.g., word embeddings) for symbol sequences identified in an image of a document, in accordance with some implementations of the present disclosure. At operation 610, the processing device (e.g., a computer) implementing method 600 may perform optical character recognition (OCR) of an image of a document to obtain an OCR text of the document.

At operation 620, the processing device performing method 600 may partition the OCR text into the plurality of symbol sequences SymSeq(x,y) of the document. Symbol sequences may be alphanumeric, graphic, or combined. Alphanumeric sequences may represent text (syllables, words, sentences), numbers, glyphs, and so on. Graphic sequences may represent table graphics elements, such as a horizontal line, a vertical line, an oblique line, a corner (a two-way line intersection that may be indicative of a corner table partition), a three-way line intersection (that may be indicative of an edge table partition), or a four-way line intersection (that may be indicative of an inside table partition). A combined sequence may be a combination of one or more alphanumeric symbols and one or more table graphics elements. A sequence may have a plurality of symbols, but may be a single symbol, in some instances.

At block 630, the processing device performing method 600 may input the plurality of symbol sequences into neural network A. The neural network A may be the subsystem (subnetwork) A 240 described in relation to FIG. 2. The purpose of the neural network A may be to determine a plurality of vectors representative of the symbol sequences determined at block 620. In particular, at block 640, the neural network A may determine a word embedding for each one of the plurality of symbol sequences. The word embeddings may be vectors vec(x,y)=$(Z_1, Z_2, \ldots Z_N)$ corresponding to the identified symbol sequences SymSeq(x,y), as described above in relation to FIG. 2. The neural network A may be previously trained on input documents, which may be of a similar type to the target document.

The determined vectors (e.g., word embeddings) vec(x, y)=$(Z_1, Z_2, \ldots Z_N)$ may be input into the neural network B (650). The neural network B may be the subsystem B (260) described in relation to FIG. 2. The purpose of the neural network B may be to recalculate vectors {vec(x,y)}→{VEC (x,y)} taking into account a global context of the entire document and to determine the association values, as described above.

Figure 7:
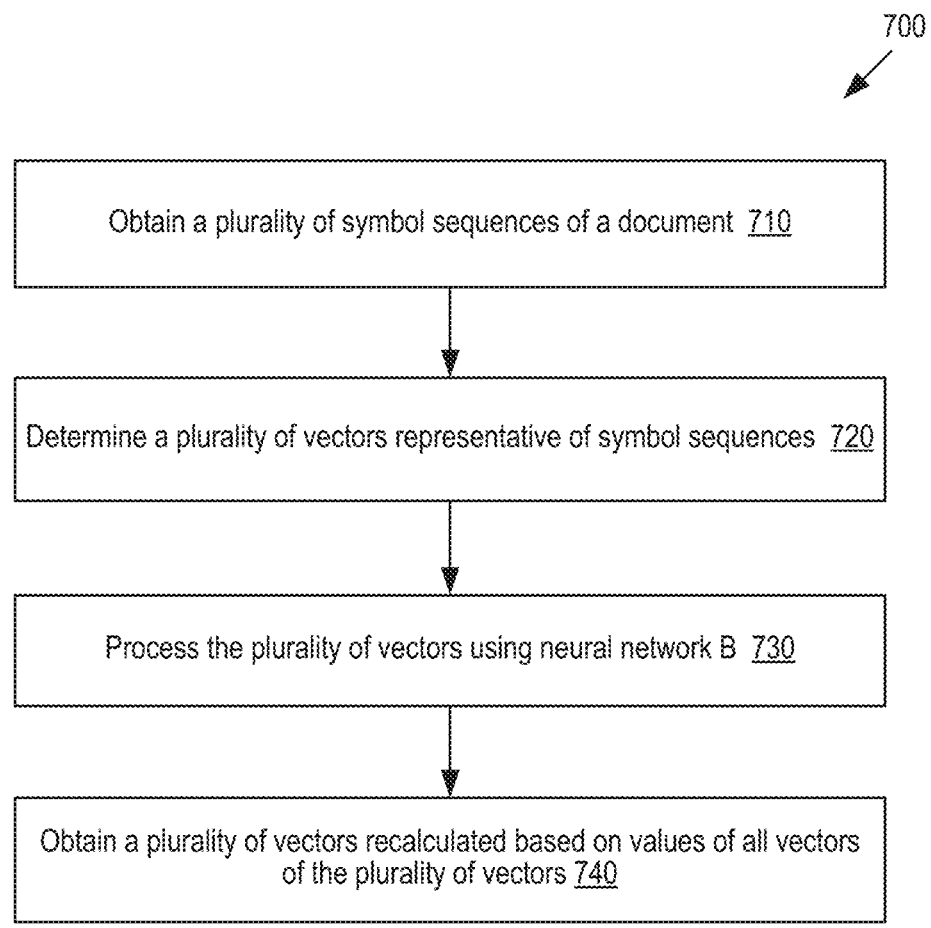
FIG. 7 is a flow diagram illustrating another exemplary method that uses neural networks to determine associations between symbol sequences using the global document context, in accordance with some implementations of the present disclosure.

FIG. 7 is a flow diagram illustrating another exemplary method 700 that uses neural networks to determine associations between symbol sequences using the global document context, in accordance with some implementations of the present disclosure. At operation 710, a processing device performing method 700 may obtain a plurality of symbol sequences of a document. In one implementation, operation 710 may be similar to operations 610 and 620 of method 600. At operation 720, the processing device may determine a plurality of vectors vec(x,y) representative of symbol sequences.

At operation 730 the method 700 may continue with processing the plurality of vectors {vec(x,y)} using neural network B (subsystem 260). The output of the neural network B may be a plurality of vectors, {vec(x,y)}→{VEC (x,y)}, recalculated based on values of all or some of the vectors of the plurality of vectors (box 740). To obtain the plurality of recalculated vectors, the processing device performing method 700 may use a first subnetwork (e.g., networks 310) of the plurality of subnetworks to recalculate the plurality of vectors in a direction of increasing or decreasing horizontal coordinates of the vectors. The processing device performing method 700 may also use a second subnetwork (e.g., network 320) of the plurality of subnetworks to recalculate the plurality of vectors in a direction of increasing or decreasing vertical coordinates of the vectors, as described in connection with FIG. 3. The outputs of the networks 310 and 320 may be concatenated and the set of recalculated vectors {VEC(x,y)} may be determined from the concatenated results, as described above.

Figure 8:
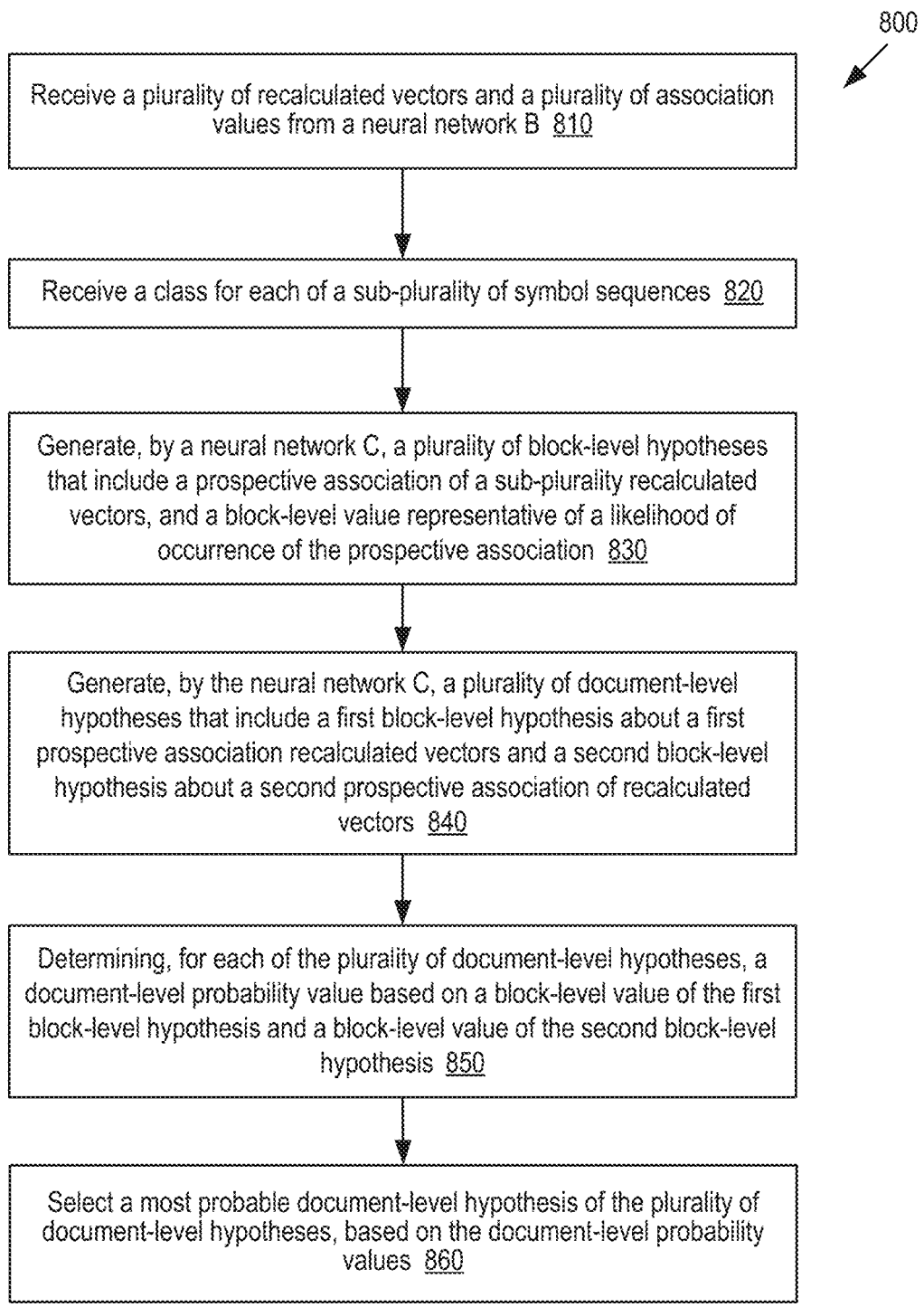
FIG. 8 is flow diagram illustrating method that uses neural networks to generate and test a plurality of hypotheses of block associations of symbol sequences of a document, in accordance with some implementations of the present disclosure.

FIG. 8 is flow diagram illustrating method 800 that uses neural networks to generate and test a plurality of hypotheses of block associations of symbol sequences of a document, in accordance with some implementations of the present disclosure. At operation block 810 the method 800 may receive the plurality of recalculated vectors {VEC(x, y)} from the neural network B. At block 820, the processing device performing method 800 may also receive a class for each of a sub-plurality of symbol sequences. In some implementation, both the recalculated vectors and the classes of symbol sequences may be output by the same neural network B.

At operation 830, the processing device performing method 800 may generate, e.g., by a neural network C, a plurality of block-level hypotheses, wherein each of the plurality of block-level hypotheses may include a prospective association of a sub-plurality of the plurality of recalculated vectors. Each hypothesis may further include a block-level value representative of a likelihood of occurrence of the prospective association. The block-level value may be determined using one or more association values corresponding to connections between symbol sequences represented by the sub-plurality of recalculated vectors, as well as classes of symbol sequences received at operation 820.

At operation 840, the method 800 may continue with generating a plurality of document-level hypotheses, wherein each of the document-level hypotheses may include a first block-level hypothesis and a second block-level hypothesis. The first block-level hypothesis may include a first prospective association of a first sub-plurality of the plurality of recalculated vectors. Similarly, a second block-level hypothesis may include a second prospective association of a second sub-plurality of the plurality of recalculated vectors.

At operation 850, the processing device performing method 800 may determine, for each of the plurality of document-level hypotheses, a document-level probability value based on a block-level value of the first block-level hypothesis and a block-level value of the second block-level hypothesis. The processing device may select (operation 860) a most probable document-level hypothesis of the plurality of document-level hypotheses, based on the document-level probability values for each of the plurality of document-level hypothesis.

Figure 9:
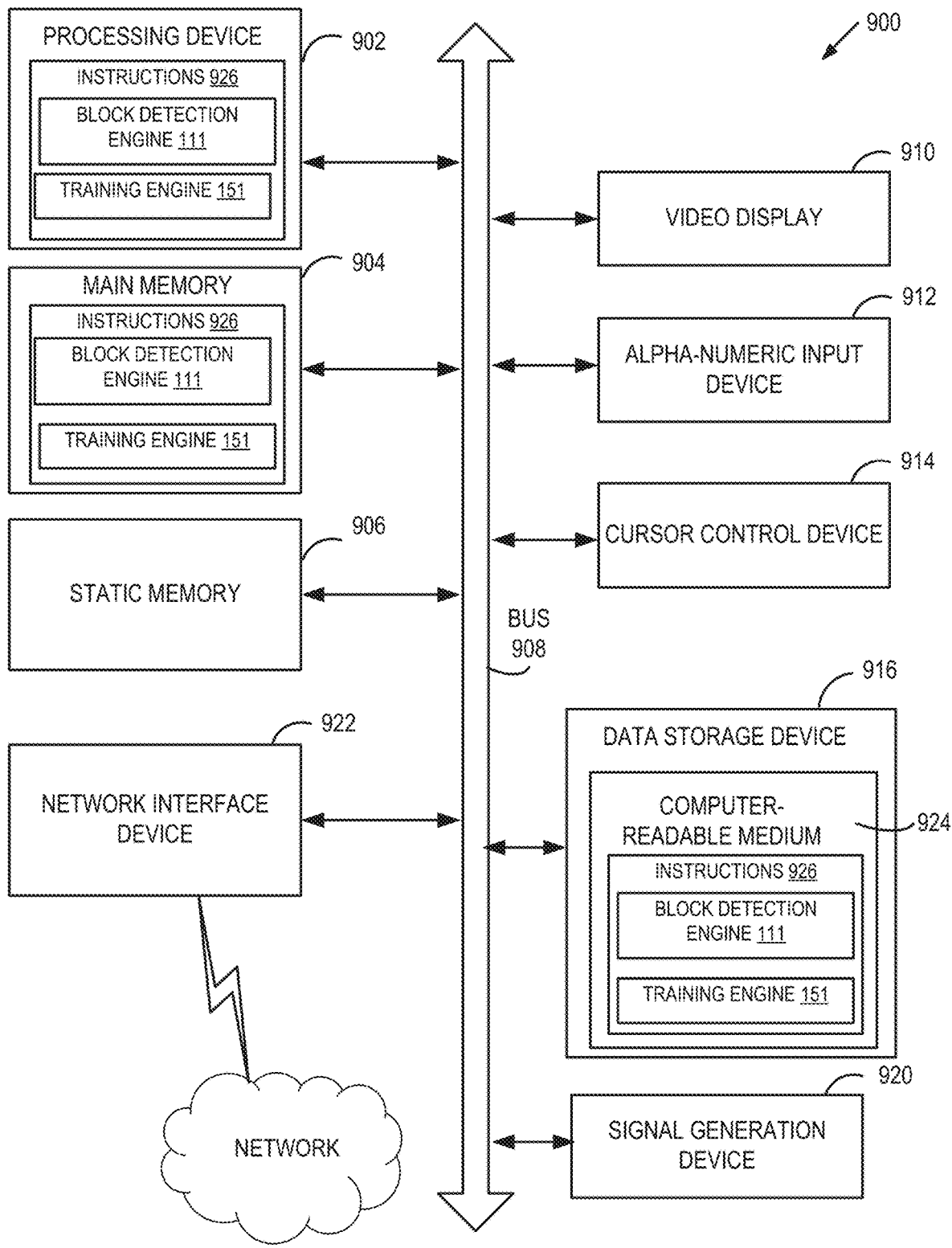
FIG. 9 illustrates a block diagram of a computer system in accordance with some implementations of the present disclosure.

FIG. 9 depicts an example computer system 900 which can perform any one or more of the methods described herein. The computer system may be connected (e.g., networked) to other computer systems in a LAN, an intranet, an extranet, or the Internet. The computer system may operate in the capacity of a server in a client-server network environment. The computer system may be a personal computer (PC), a tablet computer, a set-top box (STB), a Personal Digital Assistant (PDA), a mobile phone, a camera, a video camera, or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The exemplary computer system 900 includes a processing device 902, a main memory 904 (e.g., read-only memory (ROM), flash memory, dynamic random access memory (DRAM) such as synchronous DRAM (SDRAM)), a static memory 906 (e.g., flash memory, static random access memory (SRAM)), and a data storage device 916, which communicate with each other via a bus 908.

Processing device 902 represents one or more general-purpose processing devices such as a microprocessor, central processing unit, or the like. More particularly, the processing device 902 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 902 may also be one or more special-purpose processing devices such as an application specific integrated circuit (ASIC), a field programmable gate array (FPGA), a digital signal processor (DSP), network processor, or the like. The processing device 902 is configured to execute instructions 926 for implementing the block detection engine 111 and/or the training engine 151 of FIG. 1A and to perform the operations and steps discussed herein (e.g., methods 500-800 of FIGS. 5-8).

The computer system 900 may further include a network interface device 922. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), and a signal generation device 920 (e.g., a speaker). In one illustrative example, the video display unit 910, the alphanumeric input device 912, and the cursor control device 914 may be combined into a single component or device (e.g., an LCD touch screen).

The data storage device 916 may include a computer-readable storage medium 924 on which is stored the instructions 926 embodying any one or more of the methodologies or functions described herein. The instructions 926 may also reside, completely or at least partially, within the main memory 904 and/or within the processing device 902 during execution thereof by the computer system 900, the main memory 904 and the processing device 902 also constituting computer-readable media. In some implementations, the instructions 926 may further be transmitted or received over a network via the network interface device 922.

While the computer-readable storage medium 924 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In certain implementations, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

In the above description, numerous details are set forth. It will be apparent, however, to one skilled in the art, that the aspects of the present disclosure may be practiced without these specific details. In some instances, well-known structures and devices are shown in block diagram form, rather than in detail, in order to avoid obscuring the present disclosure.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving," "determining," "selecting," "storing," "analyzing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer-readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description. In addition, aspects of the present disclosure are not described with reference to any particular programming language. It will be appreciated that a variety of programming languages may be used to implement the teachings of the present disclosure as described herein.

Aspects of the present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read-only memory ("ROM"), random access memory ("RAM"), magnetic disk storage media, optical storage media, flash memory devices, etc.).

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" or "an implementation" or "one implementation" throughout is not intended to mean the same implementation or implementation unless described as such. Furthermore, the terms "first," "second," "third," "fourth," etc. as used herein are meant as labels to distinguish among different elements and may not necessarily have an ordinal meaning according to their numerical designation.

Whereas many alterations and modifications of the disclosure will no doubt become apparent to a person of ordinary skill in the art after having read the foregoing description, it is to be understood that any particular implementation shown and described by way of illustration is in no way intended to be considered limiting. Therefore, references to details of various implementations are not intended to limit the scope of the claims, which in themselves recite only those features regarded as the disclosure.

What is claimed is:

1. A method, comprising:
    obtaining a plurality of symbol sequences of a document, the document having a first block of associated symbol sequences, the first block comprising two or more symbol sequences of the plurality of symbol sequences;
    determining a plurality of vectors, wherein a vector of the plurality of vectors is representative of one of the plurality of symbol sequences;
    processing, by a processing device, the plurality of vectors using a first neural network to:
        obtain a plurality of recalculated vectors, wherein each of the plurality of recalculated vectors is recalculated based on values of the plurality of vectors; and
        determine a plurality of association values, wherein each of the plurality of association values corresponds to one of a plurality of connections between at least two symbol sequences of the plurality of symbol sequences; and
    identifying, by the processing device, using the plurality of recalculated vectors and the plurality of association values, the first block of associated symbol sequences.

2. The method of claim 1, wherein identifying the first block of associated symbol sequences comprises generating a plurality of block-level hypotheses, wherein each of the plurality of block-level hypotheses comprises:
    a prospective association of a sub-plurality of the plurality of recalculated vectors; and
    a block-level value representative of a likelihood of occurrence of the prospective association, wherein the block-level value is determined using one or more association values corresponding to connections between symbol sequences represented by the sub-plurality of recalculated vectors.

3. The method of claim 2, further comprising identifying, using the plurality of block-level hypotheses, a second block of associated symbol sequences of the plurality of symbol sequences of the document.

4. The method of claim 3, wherein identifying the second block of associated symbol sequences comprises generating a plurality of document-level hypotheses, wherein each of the document-level hypotheses comprises:

a first block-level hypothesis of the plurality of block-level hypothesis, the first block-level hypothesis comprising a first prospective association of a first sub-plurality of the plurality of recalculated vectors; and a second block-level hypothesis of the plurality of block-level hypotheses, the second block-level hypothesis comprising a second prospective association of a second sub-plurality of the plurality of recalculated vectors.

5. The method of claim 4, wherein identifying the first block of associated symbol sequences and the second block of associated symbol sequences comprises:

determining, for each of the plurality of document-level hypotheses, a document-level probability value based on a block-level value of the first block-level hypothesis and a block-level value of the second block-level hypothesis; and selecting a most probable document-level hypothesis of the plurality of document-level hypotheses, based on the document-level probability values for each of the plurality of document-level hypothesis.

6. The method of claim 1, wherein processing the plurality of vectors using the first neural network comprises determining a class for each of a sub-plurality of symbol sequences of the document, and wherein identifying the first block of associated symbol sequences is further based on the class for each of the sub-plurality of symbol sequences.

7. The method of claim 1, wherein obtaining the plurality of symbol sequences of the document comprises:

performing optical character recognition (OCR) of an image of the document to obtain an OCR text of the document; and partitioning the OCR text into the plurality of symbol sequences.

8. The method of claim 1, wherein determining the plurality of vectors representative of the plurality of symbol sequences comprises determining, using a second neural network, a word embedding for each one of the plurality of symbol sequences.

9. The method of claim 1, wherein the first neural network comprises a plurality of subnetworks, each of the subnetworks comprising at least one hidden layer of neurons.

10. The method of claim 9, wherein a first subnetwork of the plurality of subnetworks is to recalculate the plurality of vectors in a direction of increasing or decreasing horizontal coordinates of the vectors, and wherein a second subnetwork of the plurality of subnetworks is to recalculate the plurality of vectors in a direction of increasing or decreasing vertical coordinates of the vectors.

11. The method of claim 1, further comprising:
determining locations of symbol sequences of the first block of associated symbol sequences; and
storing the determined locations in a data store.

12. The method of claim 11, further comprising:
obtaining a subsequent document;
obtaining a symbol sequence of the subsequent document;
determining that the symbol sequence of the subsequent document has a location in the subsequent document that coincides, within a pre-determined accuracy, with one of the locations of the symbol sequences of the first block of associated symbol sequences; and
associating the symbol sequence of the subsequent document with the first block.

13. A non-transitory machine-readable storage medium including instructions that, when accessed by a processing device, cause the processing device to:

obtain a plurality of symbol sequences of a document, the document having a first block of associated symbol sequences, the first block comprising two or more symbol sequences of the plurality of symbol sequences;

determine a plurality of vectors, wherein a vector of the plurality of vectors is representative of one of the plurality of symbol sequences;

process the plurality of vectors using a first neural network to:

obtain a plurality of recalculated vectors, wherein each of the plurality of recalculated vectors is recalculated based on values of the plurality of vectors; and determine a plurality of association values, wherein each of the plurality of association values corresponds to one of a plurality of connections between at least two symbol sequences of the plurality of symbol sequences; and identify, using the plurality of recalculated vectors and the plurality of association values, the first block of associated symbol sequences.

14. The non-transitory storage medium of claim 13, wherein to identify the first block of associated symbol sequences the instructions are to cause the processing device to generate a plurality of block-level hypotheses, wherein each of the plurality of block-level hypotheses comprises:

a prospective association of a sub-plurality of the plurality of recalculated vectors; and a block-level value representative of a likelihood of occurrence of the prospective association, wherein the block-level value is determined using one or more association values corresponding to connections between symbol sequences represented by the sub-plurality of recalculated vectors.

15. The non-transitory storage medium of claim 14, wherein the instructions are further to cause the processing device to identify, using the plurality of block-level hypotheses, a second block of associated symbol sequences of the plurality of symbol sequences of the document.

16. The non-transitory storage medium of claim 15, wherein to cause the processing device to identify the second block of associated symbol sequences the instructions are to cause the processing device to generate a plurality of document-level hypotheses, wherein each of the document-level hypotheses comprises:

a first block-level hypothesis of the plurality of block-level hypothesis, the first block-level hypothesis comprising a first prospective association of a first sub-plurality of the plurality of recalculated vectors; and a second block-level hypothesis of the plurality of block-level hypotheses, the second block-level hypothesis comprising a second prospective association of a second sub-plurality of the plurality of recalculated vectors.

17. The non-transitory storage medium of claim 16, wherein to identify the first block of associated symbol sequences and the second block of associated symbol sequences the instructions are to cause the processing device to:

determine, for each of the plurality of document-level hypotheses, a document-level probability value based on a block-level value of the first block-level hypothesis and a block-level value of the second block-level hypothesis; and select a most probable document-level hypothesis of the plurality of document-level hypotheses, based on the document-level probability values for each of the plurality of document-level hypothesis.

18. The non-transitory storage medium of to claim 13, wherein to process the plurality of vectors using the first neural network the instructions are to cause the processing device to determine a class for each of a sub-plurality of symbol sequences of the document, and wherein identifying the first block of associated symbol sequences is further based on the class for each of the sub-plurality of symbol sequences.

19. A system comprising:

a memory; and a processing device operatively coupled to the memory, the processing device to:

obtain a plurality of symbol sequences of a document, the document having a first block of associated symbol sequences, the first block comprising two or more symbol sequences of the plurality of symbol sequences;

determine a plurality of vectors, wherein a vector of the plurality of vectors is representative of one of the plurality of symbol sequences;

process the plurality of vectors using a first neural network to:

obtain a plurality of recalculated vectors, wherein each of the plurality of recalculated vectors is recalculated based on values of the plurality of vectors; and determine a plurality of association values, wherein each of the plurality of association values corresponds to one of a plurality of connections between at least two symbol sequences of the plurality of symbol sequences; and identify, using the plurality of recalculated vectors and the plurality of association values, the first block of associated symbol sequences.

20. The system of claim 19, wherein to identify the first block of associated symbol sequences the processing device is to generate a plurality of block-level hypotheses, wherein each of the plurality of block-level hypotheses comprises:

a prospective association of a sub-plurality of the plurality of recalculated vectors; and a block-level value representative of a likelihood of occurrence of the prospective association, wherein the block-level value is determined using one or more association values corresponding to connections between symbol sequences represented by the sub-plurality of recalculated vectors.

\* \* \* \* \*